US009336500B2

(12) United States Patent
Lawson et al.

(10) Patent No.: US 9,336,500 B2
(45) Date of Patent: May 10, 2016

(54) SYSTEM AND METHOD FOR AUTHORIZING AND CONNECTING APPLICATION DEVELOPERS AND USERS

(71) Applicant: Twilio, Inc., San Francisco, CA (US)

(72) Inventors: Jeffrey Lawson, San Francisco, CA (US); Evan Cooke, San Francisco, CA (US); Frank Stratton, San Francisco, CA (US); Timothy S. Milliron, San Francisco, CA (US); Matthew David Nowack, San Francisco, CA (US)

(73) Assignee: Twilio, Inc., San Francisco, CA (US)

( * ) Notice: Subject to any disclaimer, the term of this patent is extended or adjusted under 35 U.S.C. 154(b) by 0 days.

(21) Appl. No.: 13/624,715

(22) Filed: Sep. 21, 2012

(65) Prior Publication Data

US 2013/0072160 A1    Mar. 21, 2013

Related U.S. Application Data

(60) Provisional application No. 61/537,207, filed on Sep. 21, 2011, provisional application No. 61/621,867, filed on Apr. 9, 2012.

(51) Int. Cl.
*G06Q 10/06* (2012.01)
*H04L 29/06* (2006.01)
(Continued)

(52) U.S. Cl.
CPC .............. *G06Q 10/06* (2013.01); *G06F 21/105* (2013.01); *H04L 63/102* (2013.01); *G06F 8/60* (2013.01); *G06F 2221/0775* (2013.01); *H04M 15/705* (2013.01); *H04W 4/001* (2013.01)

(58) Field of Classification Search
CPC ..... H04W 48/00; H04W 48/02; H04W 48/16; H04W 12/04; H04W 12/06; H04W 12/08; H04W 60/00; H04W 4/001; H04W 4/24; H04W 4/26
USPC ............................. 455/410, 411, 418, 435.1
See application file for complete search history.

(56) References Cited

U.S. PATENT DOCUMENTS 5,274,700 A    12/1993    Gechter et al.
5,526,416 A    6/1996    Dezonno et al.
(Continued)

FOREIGN PATENT DOCUMENTS

DE    1684587 A    3/1971
EP    0282126 A    9/1988
(Continued)

OTHER PUBLICATIONS

Complaint for Patent Infringement, *Telinit Technologies, LLC* v. *Twilio Inc.*, dated Oct. 12, 2012.
(Continued)

*Primary Examiner* — George Eng
*Assistant Examiner* — Joseph Dean, Jr.
(74) *Attorney, Agent, or Firm* — Jeffrey Schox

(57) ABSTRACT

A system and method for authorizing application use of a user that can include creating a developer account associated with an application of an application platform; receiving an authorization request to authorize the application to act on a user account; creating a subaccount of a user, wherein the subaccount is associated with the developer account; creating an authorization record, that includes setting a permission profile for the subaccount; and returning a subaccount identifier to the developer.

21 Claims, 10 Drawing Sheets

(51) Int. Cl.
*G06F 21/10* (2013.01)
*H04W 4/00* (2009.01)
*G06F 9/445* (2006.01)
*H04M 15/00* (2006.01)

(56) References Cited

U.S. PATENT DOCUMENTS

| | | | |
|---|---|---|---|
| 5,581,608 A | 12/1996 | Jreij et al. |
| 5,598,457 A | 1/1997 | Foladare et al. |
| 5,867,495 A | 2/1999 | Elliott et al. |
| 5,934,181 A | 8/1999 | Adamczewski |
| 6,026,440 A | 2/2000 | Shrader et al. |
| 6,094,681 A | 7/2000 | Shaffer et al. |
| 6,138,143 A | 10/2000 | Gigliotti et al. |
| 6,185,565 B1 | 2/2001 | Meubus et al. |
| 6,192,123 B1 | 2/2001 | Grunsted et al. |
| 6,206,564 B1 | 3/2001 | Adamczewski |
| 6,223,287 B1 | 4/2001 | Douglas et al. |
| 6,232,979 B1 | 5/2001 | Shochet |
| 6,269,336 B1 | 7/2001 | Ladd et al. |
| 6,317,137 B1 | 11/2001 | Rosasco |
| 6,373,836 B1 | 4/2002 | Deryugin et al. |
| 6,425,012 B1 | 7/2002 | Trovato et al. |
| 6,426,995 B1 | 7/2002 | Kim et al. |
| 6,430,175 B1 | 8/2002 | Echols et al. |
| 6,434,528 B1 | 8/2002 | Sanders |
| 6,445,694 B1 | 9/2002 | Swartz |
| 6,445,776 B1 | 9/2002 | Shank et al. |
| 6,459,913 B2 | 10/2002 | Cloutier |
| 6,493,558 B1 | 12/2002 | Bernhart et al. |
| 6,496,500 B2 | 12/2002 | Nance et al. |
| 6,501,739 B1 | 12/2002 | Cohen |
| 6,501,832 B1 | 12/2002 | Saylor et al. |
| 6,507,875 B1 | 1/2003 | Mellen-Garnett et al. |
| 6,577,721 B1 | 6/2003 | Vainio et al. |
| 6,600,736 B1 | 7/2003 | Ball et al. |
| 6,606,596 B1 | 8/2003 | Zirngibl et al. |
| 6,614,783 B1 | 9/2003 | Sonesh et al. |
| 6,625,258 B1 | 9/2003 | Ram et al. |
| 6,625,576 B2 | 9/2003 | Kochanski et al. |
| 6,636,504 B1 | 10/2003 | Albers et al. |
| 6,662,231 B1 | 12/2003 | Drosset et al. |
| 6,704,785 B1 | 3/2004 | Koo et al. |
| 6,707,889 B1 | 3/2004 | Saylor et al. |
| 6,711,129 B1 | 3/2004 | Bauer et al. |
| 6,711,249 B2 | 3/2004 | Weissman et al. |
| 6,738,738 B2 | 5/2004 | Henton |
| 6,757,365 B1 | 6/2004 | Bogard |
| 6,765,997 B1 | 7/2004 | Zirngibl et al. |
| 6,768,788 B1 | 7/2004 | Langseth et al. |
| 6,778,653 B1 | 8/2004 | Kallas et al. |
| 6,785,266 B2 | 8/2004 | Swartz |
| 6,788,768 B1 | 9/2004 | Saylor et al. |
| 6,792,086 B1 | 9/2004 | Saylor et al. |
| 6,792,093 B2 | 9/2004 | Barak et al. |
| 6,798,867 B1 | 9/2004 | Zirngibl et al. |
| 6,807,529 B2 | 10/2004 | Johnson et al. |
| 6,807,574 B1 | 10/2004 | Partovi et al. |
| 6,819,667 B1 | 11/2004 | Brusilovsky et al. |
| 6,820,260 B1 | 11/2004 | Flockhart et al. |
| 6,829,334 B1 | 12/2004 | Zirngibl et al. |
| 6,834,265 B2 | 12/2004 | Balasuriya |
| 6,836,537 B1 | 12/2004 | Zirngibl et al. |
| 6,842,767 B1 | 1/2005 | Partovi et al. |
| 6,850,603 B1 | 2/2005 | Eberle et al. |
| 6,870,830 B1 | 3/2005 | Schuster et al. |
| 6,873,952 B1 | 3/2005 | Bailey et al. |
| 6,874,084 B1 | 3/2005 | Dobner et al. |
| 6,885,737 B1 | 4/2005 | Gao et al. |
| 6,888,929 B1 | 5/2005 | Saylor et al. |
| 6,895,084 B1 | 5/2005 | Saylor et al. |
| 6,898,567 B2 | 5/2005 | Balasuriya |
| 6,912,581 B2 | 6/2005 | Johnson et al. |
| 6,922,411 B1 | 7/2005 | Taylor |
| 6,931,405 B2 | 8/2005 | El-Shimi et al. |
| 6,937,699 B1 | 8/2005 | Schuster et al. |
| 6,940,953 B1 | 9/2005 | Eberle et al. |
| 6,941,268 B2 | 9/2005 | Porter et al. |
| 6,947,417 B2 | 9/2005 | Laursen et al. |
| 6,947,988 B1 | 9/2005 | Saleh |
| 6,961,330 B1 | 11/2005 | Cattan et al. |
| 6,964,012 B1 | 11/2005 | Zirngibl et al. |
| 6,970,915 B1 | 11/2005 | Partovi et al. |
| 6,977,992 B2 | 12/2005 | Zirngibl et al. |
| 6,985,862 B2 | 1/2006 | Stroem et al. |
| 6,999,576 B2 | 2/2006 | Sacra |
| 7,003,464 B2 | 2/2006 | Ferrans et al. |
| 7,006,606 B1 | 2/2006 | Cohen et al. |
| 7,010,586 B1 | 3/2006 | Allavarpu et al. |
| 7,020,685 B1 | 3/2006 | Chen et al. |
| 7,039,165 B1 | 5/2006 | Saylor et al. |
| 7,062,709 B2 | 6/2006 | Cheung |
| 7,076,037 B1 | 7/2006 | Gonen et al. |
| 7,076,428 B2 | 7/2006 | Anastasakos et al. |
| 7,089,310 B1 | 8/2006 | Ellerman et al. |
| 7,103,003 B2 | 9/2006 | Brueckheimer et al. |
| 7,103,171 B1 | 9/2006 | Annadata et al. |
| 7,106,844 B1 | 9/2006 | Holland |
| 7,111,163 B1 | 9/2006 | Haney |
| 7,140,004 B1 | 11/2006 | Kunins et al. |
| 7,143,039 B1 | 11/2006 | Stifelman et al. |
| 7,197,331 B2 | 3/2007 | Anastasakos et al. |
| 7,197,461 B1 | 3/2007 | Eberle et al. |
| 7,197,462 B2 | 3/2007 | Takagi et al. |
| 7,197,544 B2 | 3/2007 | Wang et al. |
| 7,225,232 B2 | 5/2007 | Elberse |
| 7,227,849 B1 | 6/2007 | Raesaenen |
| 7,260,208 B2 | 8/2007 | Cavalcanti |
| 7,266,181 B1 | 9/2007 | Zirngibl et al. |
| 7,269,557 B1 | 9/2007 | Bailey et al. |
| 7,272,212 B2 | 9/2007 | Eberle et al. |
| 7,272,564 B2 | 9/2007 | Phillips et al. |
| 7,277,851 B1 | 10/2007 | Henton |
| 7,283,515 B2 | 10/2007 | Fowler |
| 7,286,521 B1 | 10/2007 | Jackson et al. |
| 7,287,248 B1 | 10/2007 | Adeeb |
| 7,289,453 B2 | 10/2007 | Riedel et al. |
| 7,296,739 B1 | 11/2007 | Mo et al. |
| 7,298,732 B2 | 11/2007 | Cho |
| 7,308,085 B2 | 12/2007 | Weissman |
| 7,308,408 B1 | 12/2007 | Stifelman et al. |
| 7,324,633 B2 | 1/2008 | Gao et al. |
| 7,324,942 B1 | 1/2008 | Mahowald et al. |
| 7,328,263 B1 | 2/2008 | Sadjadi |
| 7,330,463 B1 | 2/2008 | Bradd et al. |
| 7,330,890 B1 | 2/2008 | Partovi et al. |
| 7,340,040 B1 | 3/2008 | Saylor et al. |
| 7,349,714 B2 | 3/2008 | Lee et al. |
| 7,369,865 B2 | 5/2008 | Gabriel et al. |
| 7,373,660 B1 | 5/2008 | Guichard et al. |
| 7,376,223 B2 | 5/2008 | Taylor et al. |
| 7,376,586 B1 | 5/2008 | Partovi et al. |
| 7,376,733 B2 | 5/2008 | Connelly et al. |
| 7,376,740 B1 | 5/2008 | Porter et al. |
| 7,412,525 B2 | 8/2008 | Cafarella et al. |
| 7,418,090 B2 | 8/2008 | Reding et al. |
| 7,428,302 B2 | 9/2008 | Zirngibl et al. |
| 7,440,898 B1 | 10/2008 | Eberle et al. |
| 7,447,299 B1 | 11/2008 | Partovi et al. |
| 7,454,459 B1 | 11/2008 | Kapoor et al. |
| 7,457,249 B2 | 11/2008 | Baldwin et al. |
| 7,457,397 B1 | 11/2008 | Saylor et al. |
| 7,473,872 B2 | 1/2009 | Takimoto |
| 7,486,780 B2 | 2/2009 | Zirngibl et al. |
| 7,496,054 B2 | 2/2009 | Taylor |
| 7,500,249 B2 | 3/2009 | Kampe et al. |
| 7,505,951 B2 | 3/2009 | Thompson et al. |
| 7,519,359 B2 | 4/2009 | Chiarulli et al. |
| 7,522,711 B1 | 4/2009 | Stein et al. |
| 7,536,454 B2 | 5/2009 | Balasuriya |
| 7,552,054 B1 | 6/2009 | Stifelman et al. |
| 7,571,226 B1 | 8/2009 | Partovi et al. |
| 7,613,287 B1 | 11/2009 | Stifelman et al. |
| 7,623,648 B1 | 11/2009 | Oppenheim et al. |

(56) References Cited

U.S. PATENT DOCUMENTS

| | | |
|---|---|---|
| 7,630,900 B1 | 12/2009 | Strom |
| 7,631,310 B1 | 12/2009 | Henzinger |
| 7,644,000 B1 | 1/2010 | Strom |
| 7,657,433 B1 | 2/2010 | Chang |
| 7,657,434 B2 | 2/2010 | Thompson et al. |
| 7,668,157 B2 | 2/2010 | Weintraub et al. |
| 7,672,295 B1 | 3/2010 | Andhare et al. |
| 7,675,857 B1 | 3/2010 | Chesson |
| 7,676,221 B2 | 3/2010 | Roundtree et al. |
| 7,715,547 B2 | 5/2010 | Ibbotson et al. |
| 7,742,499 B1 | 6/2010 | Erskine et al. |
| 7,779,065 B2 | 8/2010 | Gupta et al. |
| 7,875,836 B2 | 1/2011 | Imura et al. |
| 7,882,253 B2 | 2/2011 | Pardo-Castellote et al. |
| 7,920,866 B2 | 4/2011 | Bosch et al. |
| 7,926,099 B1 | 4/2011 | Chakravarty et al. |
| 7,936,867 B1 | 5/2011 | Hill et al. |
| 7,962,644 B1 | 6/2011 | Ezerzer et al. |
| 7,979,555 B2 | 7/2011 | Rothstein et al. |
| 8,023,425 B2 | 9/2011 | Raleigh |
| 8,069,096 B1 | 11/2011 | Ballaro et al. |
| 8,081,958 B2 | 12/2011 | Soederstroem et al. |
| 8,103,725 B2 | 1/2012 | Gupta et al. |
| 8,126,128 B1 | 2/2012 | Hicks, III et al. |
| 8,149,716 B2 | 4/2012 | Ramanathan et al. |
| 8,150,918 B1 | 4/2012 | Edelman et al. |
| 8,156,213 B1 | 4/2012 | Deng et al. |
| 8,185,619 B1 | 5/2012 | Maiocco et al. |
| 8,196,133 B2 | 6/2012 | Kakumani et al. |
| 8,233,611 B1 | 7/2012 | Zettner |
| 8,238,533 B2 | 8/2012 | Blackwell et al. |
| 8,243,889 B2 | 8/2012 | Taylor et al. |
| 8,266,327 B2 | 9/2012 | Kumar et al. |
| 8,295,272 B2 | 10/2012 | Boni et al. |
| 8,306,021 B2 | 11/2012 | Lawson et al. |
| 8,326,805 B1 | 12/2012 | Arous et al. |
| 8,346,630 B1 | 1/2013 | McKeown |
| 8,355,394 B2 | 1/2013 | Taylor et al. |
| 8,417,817 B1 | 4/2013 | Jacobs |
| 8,429,827 B1 | 4/2013 | Wetzel |
| 8,438,315 B1 | 5/2013 | Tao et al. |
| 8,462,670 B2 | 6/2013 | Chien et al. |
| 8,467,502 B2 | 6/2013 | Sureka et al. |
| 8,503,639 B2 | 8/2013 | Reding et al. |
| 8,503,650 B2 | 8/2013 | Reding et al. |
| 8,509,068 B2 | 8/2013 | Begall et al. |
| 8,532,686 B2 | 9/2013 | Schmidt et al. |
| 8,542,805 B2 | 9/2013 | Agranovsky et al. |
| 8,582,450 B1 | 11/2013 | Robesky |
| 8,594,626 B1 | 11/2013 | Woodson et al. |
| 8,601,136 B1 | 12/2013 | Fahlgren et al. |
| 8,611,338 B2 | 12/2013 | Lawson et al. |
| 8,613,102 B2 | 12/2013 | Nath |
| 8,649,268 B2 | 2/2014 | Lawson et al. |
| 8,667,056 B1 | 3/2014 | Proulx et al. |
| 8,675,493 B2 | 3/2014 | Buddhikot et al. |
| 8,755,376 B2 | 6/2014 | Lawson et al. |
| 8,767,925 B2 | 7/2014 | Sureka et al. |
| 8,806,024 B1 | 8/2014 | Francis et al. |
| 8,837,465 B2 | 9/2014 | Lawson et al. |
| 8,838,707 B2 | 9/2014 | Lawson et al. |
| 8,861,510 B1 | 10/2014 | Fritz |
| 8,948,356 B2 | 2/2015 | Nowack et al. |
| 8,964,726 B2 | 2/2015 | Lawson et al. |
| 9,014,664 B2 | 4/2015 | Kim et al. |
| 9,015,702 B2 | 4/2015 | Bhat |
| 2001/0038624 A1 | 11/2001 | Greenberg et al. |
| 2001/0043684 A1 | 11/2001 | Guedalia et al. |
| 2001/0051996 A1 | 12/2001 | Cooper et al. |
| 2002/0006124 A1 | 1/2002 | Jimenez et al. |
| 2002/0006125 A1 | 1/2002 | Josse et al. |
| 2002/0006193 A1 | 1/2002 | Rodenbusch et al. |
| 2002/0064267 A1 | 5/2002 | Martin et al. |
| 2002/0067823 A1 | 6/2002 | Walker et al. |
| 2002/0077833 A1 | 6/2002 | Arons et al. |
| 2002/0126813 A1 | 9/2002 | Partovi et al. |
| 2002/0136391 A1 | 9/2002 | Armstrong |
| 2002/0165957 A1 | 11/2002 | Devoe et al. |
| 2002/0176378 A1 | 11/2002 | Hamilton et al. |
| 2002/0198941 A1 | 12/2002 | Gavrilescu et al. |
| 2003/0006137 A1 | 1/2003 | Wei et al. |
| 2003/0014665 A1 | 1/2003 | Anderson et al. |
| 2003/0018830 A1 | 1/2003 | Chen et al. |
| 2003/0023672 A1 | 1/2003 | Vaysman |
| 2003/0026426 A1 | 2/2003 | Wright et al. |
| 2003/0046366 A1 | 3/2003 | Pardikar et al. |
| 2003/0051037 A1 | 3/2003 | Sundaram et al. |
| 2003/0058884 A1 | 3/2003 | Kallner et al. |
| 2003/0059020 A1 | 3/2003 | Meyerson et al. |
| 2003/0060188 A1 | 3/2003 | Gidron et al. |
| 2003/0061317 A1 | 3/2003 | Brown et al. |
| 2003/0061404 A1 | 3/2003 | Atwal et al. |
| 2003/0088421 A1 | 5/2003 | Maes et al. |
| 2003/0097447 A1 | 5/2003 | Johnston |
| 2003/0103620 A1 | 6/2003 | Brown et al. |
| 2003/0123640 A1 | 7/2003 | Roelle et al. |
| 2003/0195990 A1 | 10/2003 | Greenblat |
| 2003/0196076 A1 | 10/2003 | Zabarski et al. |
| 2003/0211842 A1 | 11/2003 | Kempf et al. |
| 2003/0231647 A1 | 12/2003 | Petrovykh |
| 2004/0008635 A1 | 1/2004 | Nelson et al. |
| 2004/0011690 A1 | 1/2004 | Marfino et al. |
| 2004/0044953 A1* | 3/2004 | Watkins ............ H04M 1/72525 715/205 |
| 2004/0052349 A1 | 3/2004 | Creamer et al. |
| 2004/0071275 A1 | 4/2004 | Bowater et al. |
| 2004/0101122 A1 | 5/2004 | Da Palma et al. |
| 2004/0102182 A1 | 5/2004 | Reith et al. |
| 2004/0165569 A1 | 8/2004 | Sweatman et al. |
| 2004/0172482 A1 | 9/2004 | Weissman et al. |
| 2004/0205689 A1 | 10/2004 | Ellens et al. |
| 2004/0213400 A1 | 10/2004 | Golitsin et al. |
| 2004/0218748 A1 | 11/2004 | Fisher |
| 2004/0228469 A1 | 11/2004 | Andrews et al. |
| 2004/0240649 A1 | 12/2004 | Goel |
| 2005/0005200 A1 | 1/2005 | Matena et al. |
| 2005/0010483 A1 | 1/2005 | Ling |
| 2005/0021626 A1 | 1/2005 | Prajapat et al. |
| 2005/0025303 A1 | 2/2005 | Hostetler |
| 2005/0038772 A1 | 2/2005 | Colrain |
| 2005/0043952 A1 | 2/2005 | Sharma et al. |
| 2005/0047579 A1 | 3/2005 | Salame |
| 2005/0060411 A1 | 3/2005 | Coulombe et al. |
| 2005/0091572 A1 | 4/2005 | Gavrilescu et al. |
| 2005/0125251 A1 | 6/2005 | Berger et al. |
| 2005/0128961 A1 | 6/2005 | Miloslavsky et al. |
| 2005/0135578 A1 | 6/2005 | Ress et al. |
| 2005/0141500 A1* | 6/2005 | Bhandari ............ H04M 1/2473 370/389 |
| 2005/0147088 A1 | 7/2005 | Bao et al. |
| 2005/0177635 A1 | 8/2005 | Schmidt et al. |
| 2005/0181835 A1 | 8/2005 | Lau et al. |
| 2005/0228680 A1 | 10/2005 | Malik |
| 2005/0238153 A1 | 10/2005 | Chevalier |
| 2005/0240659 A1 | 10/2005 | Taylor |
| 2005/0243977 A1 | 11/2005 | Creamer et al. |
| 2005/0246176 A1 | 11/2005 | Creamer et al. |
| 2005/0289222 A1 | 12/2005 | Sahim |
| 2006/0008073 A1 | 1/2006 | Yoshizawa et al. |
| 2006/0015467 A1 | 1/2006 | Morken et al. |
| 2006/0047666 A1 | 3/2006 | Bedi et al. |
| 2006/0067506 A1 | 3/2006 | Flockhart et al. |
| 2006/0129638 A1 | 6/2006 | Deakin |
| 2006/0143007 A1 | 6/2006 | Koh et al. |
| 2006/0168334 A1 | 7/2006 | Potti et al. |
| 2006/0203979 A1 | 9/2006 | Jennings |
| 2006/0209695 A1 | 9/2006 | Archer et al. |
| 2006/0212865 A1* | 9/2006 | Vincent ............ G06F 8/65 717/168 |
| 2006/0215824 A1 | 9/2006 | Mitby et al. |
| 2006/0217823 A1 | 9/2006 | Hussey |
| 2006/0217978 A1 | 9/2006 | Mitby et al. |
| 2006/0222166 A1 | 10/2006 | Ramakrishna et al. |
| 2006/0256816 A1 | 11/2006 | Yarlagadda et al. |

(56) References Cited

U.S. PATENT DOCUMENTS

| | | |
|---|---|---|
| 2006/0262915 A1 | 11/2006 | Marascio et al. |
| 2006/0270386 A1 | 11/2006 | Yu et al. |
| 2006/0285489 A1 | 12/2006 | Francisco et al. |
| 2007/0002744 A1 | 1/2007 | Mewhinney et al. |
| 2007/0036143 A1 | 2/2007 | Alt et al. |
| 2007/0050306 A1 | 3/2007 | Mcqueen |
| 2007/0070906 A1 | 3/2007 | Thakur |
| 2007/0070980 A1 | 3/2007 | Phelps et al. |
| 2007/0071223 A1 | 3/2007 | Lee et al. |
| 2007/0074174 A1 | 3/2007 | Thornton |
| 2007/0121651 A1 | 5/2007 | Casey et al. |
| 2007/0127691 A1 | 6/2007 | Lert |
| 2007/0127703 A1 | 6/2007 | Siminoff |
| 2007/0130260 A1 | 6/2007 | Weintraub et al. |
| 2007/0133771 A1 | 6/2007 | Stifelman et al. |
| 2007/0149166 A1 | 6/2007 | Turcotte et al. |
| 2007/0153711 A1 | 7/2007 | Dykas et al. |
| 2007/0167170 A1 | 7/2007 | Fitchett et al. |
| 2007/0192629 A1 | 8/2007 | Saito |
| 2007/0208862 A1 | 9/2007 | Fox et al. |
| 2007/0232284 A1 | 10/2007 | Mason et al. |
| 2007/0242626 A1 | 10/2007 | Altberg et al. |
| 2007/0265073 A1 | 11/2007 | Novi et al. |
| 2007/0286180 A1 | 12/2007 | Marquette et al. |
| 2007/0291905 A1 | 12/2007 | Halliday et al. |
| 2007/0293200 A1 | 12/2007 | Roundtree et al. |
| 2007/0295803 A1 | 12/2007 | Levine et al. |
| 2008/0005275 A1 | 1/2008 | Overton et al. |
| 2008/0025320 A1 | 1/2008 | Bangalore et al. |
| 2008/0037715 A1 | 2/2008 | Prozeniuk et al. |
| 2008/0037746 A1 | 2/2008 | Dufrene et al. |
| 2008/0040484 A1 | 2/2008 | Yardley |
| 2008/0052395 A1 | 2/2008 | Wright et al. |
| 2008/0091843 A1 | 4/2008 | Kulkarni |
| 2008/0101571 A1 | 5/2008 | Harlow et al. |
| 2008/0104348 A1 | 5/2008 | Kabzinski et al. |
| 2008/0134049 A1 | 6/2008 | Gupta et al. |
| 2008/0139166 A1 | 6/2008 | Agarwal et al. |
| 2008/0146268 A1 | 6/2008 | Gandhi et al. |
| 2008/0152101 A1 | 6/2008 | Griggs |
| 2008/0154601 A1 | 6/2008 | Stifelman et al. |
| 2008/0155029 A1 | 6/2008 | Helbling et al. |
| 2008/0162482 A1 | 7/2008 | Ahern et al. |
| 2008/0165708 A1 | 7/2008 | Moore et al. |
| 2008/0177883 A1 | 7/2008 | Hanai et al. |
| 2008/0201426 A1 | 8/2008 | Darcie |
| 2008/0209050 A1 | 8/2008 | Li |
| 2008/0222656 A1 | 9/2008 | Lyman |
| 2008/0229421 A1 | 9/2008 | Hudis et al. |
| 2008/0232574 A1 | 9/2008 | Baluja et al. |
| 2008/0235230 A1 | 9/2008 | Maes |
| 2008/0256224 A1 | 10/2008 | Kaji et al. |
| 2008/0275741 A1 | 11/2008 | Loeffen |
| 2008/0310599 A1 | 12/2008 | Purnadi et al. |
| 2008/0313318 A1 | 12/2008 | Vermeulen et al. |
| 2008/0316931 A1 | 12/2008 | Qiu et al. |
| 2008/0317222 A1 | 12/2008 | Griggs et al. |
| 2008/0317232 A1 | 12/2008 | Couse et al. |
| 2008/0317233 A1 | 12/2008 | Rey et al. |
| 2009/0046838 A1 | 2/2009 | Andreasson |
| 2009/0052437 A1 | 2/2009 | Taylor et al. |
| 2009/0052641 A1 | 2/2009 | Taylor et al. |
| 2009/0059894 A1 | 3/2009 | Jackson et al. |
| 2009/0063502 A1 | 3/2009 | Coimbatore et al. |
| 2009/0074159 A1 | 3/2009 | Goldfarb et al. |
| 2009/0075684 A1 | 3/2009 | Cheng et al. |
| 2009/0083155 A1 | 3/2009 | Tudor et al. |
| 2009/0089165 A1* | 4/2009 | Sweeney .............. G06Q 30/02 705/14.27 |
| 2009/0089352 A1 | 4/2009 | Davis et al. |
| 2009/0089699 A1 | 4/2009 | Saha et al. |
| 2009/0093250 A1 | 4/2009 | Jackson et al. |
| 2009/0125608 A1 | 5/2009 | Werth et al. |
| 2009/0129573 A1 | 5/2009 | Gavan et al. |
| 2009/0136011 A1 | 5/2009 | Goel |
| 2009/0170496 A1 | 7/2009 | Bourque |
| 2009/0171659 A1 | 7/2009 | Pearce et al. |
| 2009/0171669 A1 | 7/2009 | Engelsma et al. |
| 2009/0171752 A1 | 7/2009 | Galvin et al. |
| 2009/0182896 A1 | 7/2009 | Patterson et al. |
| 2009/0217293 A1 | 8/2009 | Wolber et al. |
| 2009/0220057 A1 | 9/2009 | Waters |
| 2009/0221310 A1 | 9/2009 | Chen et al. |
| 2009/0222341 A1 | 9/2009 | Belwadi et al. |
| 2009/0225748 A1 | 9/2009 | Taylor |
| 2009/0225763 A1 | 9/2009 | Forsberg et al. |
| 2009/0232289 A1 | 9/2009 | Drucker et al. |
| 2009/0234965 A1 | 9/2009 | Viveganandhan et al. |
| 2009/0235349 A1 | 9/2009 | Lai et al. |
| 2009/0252159 A1 | 10/2009 | Lawson et al. |
| 2009/0276771 A1 | 11/2009 | Nickolov et al. |
| 2009/0288012 A1 | 11/2009 | Hertel et al. |
| 2009/0288165 A1 | 11/2009 | Qiu et al. |
| 2009/0300194 A1 | 12/2009 | Ogasawara |
| 2009/0316687 A1 | 12/2009 | Kruppa |
| 2009/0318112 A1 | 12/2009 | Vasten |
| 2010/0037204 A1 | 2/2010 | Lin et al. |
| 2010/0070424 A1 | 3/2010 | Monk |
| 2010/0082513 A1 | 4/2010 | Liu |
| 2010/0087215 A1 | 4/2010 | Gu et al. |
| 2010/0088187 A1 | 4/2010 | Courtney et al. |
| 2010/0088698 A1 | 4/2010 | Krishnamurthy |
| 2010/0115041 A1 | 5/2010 | Hawkins et al. |
| 2010/0142516 A1 | 6/2010 | Lawson et al. |
| 2010/0150139 A1 | 6/2010 | Lawson et al. |
| 2010/0167689 A1 | 7/2010 | Sepehri-Nik et al. |
| 2010/0188979 A1 | 7/2010 | Thubert et al. |
| 2010/0191915 A1 | 7/2010 | Spencer |
| 2010/0208881 A1 | 8/2010 | Kawamura |
| 2010/0217837 A1 | 8/2010 | Ansari et al. |
| 2010/0217982 A1 | 8/2010 | Brown et al. |
| 2010/0232594 A1 | 9/2010 | Lawson et al. |
| 2010/0235539 A1 | 9/2010 | Carter et al. |
| 2010/0251329 A1 | 9/2010 | Wei |
| 2010/0251340 A1* | 9/2010 | Martin .................... G06F 21/51 726/4 |
| 2010/0281108 A1 | 11/2010 | Cohen |
| 2010/0291910 A1* | 11/2010 | Sanding ................ H04W 8/183 455/418 |
| 2011/0029882 A1 | 2/2011 | Jaisinghani |
| 2011/0029981 A1 | 2/2011 | Jaisinghani |
| 2011/0053555 A1 | 3/2011 | Cai et al. |
| 2011/0078278 A1 | 3/2011 | Cui et al. |
| 2011/0081008 A1 | 4/2011 | Lawson et al. |
| 2011/0083179 A1 | 4/2011 | Lawson et al. |
| 2011/0093516 A1 | 4/2011 | Geng et al. |
| 2011/0096673 A1 | 4/2011 | Stevenson et al. |
| 2011/0110366 A1 | 5/2011 | Moore et al. |
| 2011/0131293 A1 | 6/2011 | Mori |
| 2011/0167172 A1 | 7/2011 | Roach et al. |
| 2011/0170505 A1 | 7/2011 | Rajasekar et al. |
| 2011/0176537 A1 | 7/2011 | Lawson et al. |
| 2011/0211679 A1 | 9/2011 | Mezhibovsky et al. |
| 2011/0251921 A1* | 10/2011 | Kassaei .................. G06Q 20/14 705/26.41 |
| 2011/0253693 A1 | 10/2011 | Lyons et al. |
| 2011/0255675 A1 | 10/2011 | Jasper et al. |
| 2011/0265168 A1 | 10/2011 | Lucovsky et al. |
| 2011/0265172 A1 | 10/2011 | Sharma et al. |
| 2011/0267985 A1 | 11/2011 | Wilkinson et al. |
| 2011/0274111 A1 | 11/2011 | Narasappa et al. |
| 2011/0276892 A1 | 11/2011 | Jensen-Horne et al. |
| 2011/0276951 A1 | 11/2011 | Jain |
| 2011/0280390 A1 | 11/2011 | Lawson et al. |
| 2011/0283259 A1 | 11/2011 | Lawson et al. |
| 2011/0289126 A1 | 11/2011 | Aikas et al. |
| 2011/0299672 A1 | 12/2011 | Chiu et al. |
| 2011/0310902 A1 | 12/2011 | Xu |
| 2011/0320449 A1 | 12/2011 | Gudlavenkatasiva |
| 2011/0320550 A1 | 12/2011 | Lawson et al. |
| 2012/0000903 A1 | 1/2012 | Baarman et al. |
| 2012/0011274 A1 | 1/2012 | Moreman |
| 2012/0017222 A1 | 1/2012 | May |
| 2012/0023544 A1 | 1/2012 | Li et al. |

(56) References Cited

U.S. PATENT DOCUMENTS

| | | |
|---|---|---|
| 2012/0028602 A1 | 2/2012 | Lisi et al. |
| 2012/0036574 A1 | 2/2012 | Heithcock et al. |
| 2012/0039202 A1 | 2/2012 | Song |
| 2012/0059709 A1 | 3/2012 | Lieberman et al. |
| 2012/0079066 A1 | 3/2012 | Li et al. |
| 2012/0083266 A1 | 4/2012 | VanSwol et al. |
| 2012/0089572 A1 | 4/2012 | Raichstein et al. |
| 2012/0094637 A1 | 4/2012 | Jeyaseelan et al. |
| 2012/0110564 A1 | 5/2012 | Ran et al. |
| 2012/0114112 A1 | 5/2012 | Rauschenberger et al. |
| 2012/0149404 A1 | 6/2012 | Beattie et al. |
| 2012/0170726 A1 | 7/2012 | Schwartz |
| 2012/0173610 A1 | 7/2012 | Bleau et al. |
| 2012/0174095 A1 | 7/2012 | Natchadalingam et al. |
| 2012/0179907 A1 | 7/2012 | Byrd et al. |
| 2012/0180021 A1 | 7/2012 | Byrd et al. |
| 2012/0180029 A1 | 7/2012 | Hill et al. |
| 2012/0198004 A1 | 8/2012 | Watte |
| 2012/0201238 A1 | 8/2012 | Lawson et al. |
| 2012/0208495 A1 | 8/2012 | Lawson et al. |
| 2012/0226579 A1 | 9/2012 | Ha et al. |
| 2012/0239757 A1 | 9/2012 | Firstenberg et al. |
| 2012/0254828 A1 | 10/2012 | Aiylam et al. |
| 2012/0281536 A1 | 11/2012 | Gell et al. |
| 2012/0288082 A1 | 11/2012 | Segall |
| 2012/0290706 A1 | 11/2012 | Lin et al. |
| 2012/0304245 A1 | 11/2012 | Lawson et al. |
| 2012/0304275 A1 | 11/2012 | Ji et al. |
| 2012/0316809 A1* | 12/2012 | Egolf ............. G06F 8/61 702/62 |
| 2012/0321070 A1 | 12/2012 | Smith et al. |
| 2013/0029629 A1 | 1/2013 | Lindholm et al. |
| 2013/0031158 A1* | 1/2013 | Salsburg ........... G06F 9/5072 709/203 |
| 2013/0047232 A1 | 2/2013 | Tuchman et al. |
| 2013/0054684 A1 | 2/2013 | Brazier et al. |
| 2013/0058262 A1 | 3/2013 | Parreira |
| 2013/0067448 A1 | 3/2013 | Sannidhanam et al. |
| 2013/0097298 A1 | 4/2013 | Ting et al. |
| 2013/0156024 A1 | 6/2013 | Burg |
| 2013/0179942 A1 | 7/2013 | Caplis et al. |
| 2013/0201909 A1 | 8/2013 | Bosch et al. |
| 2013/0204786 A1 | 8/2013 | Mattes et al. |
| 2013/0212603 A1 | 8/2013 | Cooke et al. |
| 2013/0244632 A1 | 9/2013 | Spence et al. |
| 2014/0064467 A1 | 3/2014 | Lawson et al. |
| 2014/0105372 A1 | 4/2014 | Nowack et al. |
| 2014/0106704 A1 | 4/2014 | Cooke et al. |
| 2014/0123187 A1 | 5/2014 | Reisman |
| 2014/0129363 A1 | 5/2014 | Lorah et al. |
| 2014/0153565 A1 | 6/2014 | Lawson et al. |
| 2014/0185490 A1 | 7/2014 | Holm et al. |
| 2014/0254600 A1 | 9/2014 | Shibata et al. |
| 2014/0274086 A1 | 9/2014 | Boerjesson et al. |
| 2014/0282473 A1 | 9/2014 | Saraf et al. |
| 2014/0355600 A1 | 12/2014 | Lawson et al. |
| 2014/0379670 A1 | 12/2014 | Kuhr |
| 2015/0004932 A1 | 1/2015 | Kim et al. |
| 2015/0004933 A1 | 1/2015 | Kim et al. |
| 2015/0023251 A1 | 1/2015 | Giakoumelis et al. |
| 2015/0066865 A1 | 3/2015 | Yara et al. |
| 2015/0181631 A1 | 6/2015 | Lee et al. |

FOREIGN PATENT DOCUMENTS

| | | |
|---|---|---|
| EP | 1464418 A | 10/2004 |
| EP | 1522922 A2 | 4/2005 |
| EP | 1770586 A1 | 4/2007 |
| ES | 2134107 A | 9/1999 |
| JP | 10294788 | 4/1998 |
| JP | 2004166000 A | 6/2004 |
| JP | 2004220118 A | 8/2004 |
| JP | 2006319914 A | 11/2006 |
| WO | 9732448 A | 9/1997 |
| WO | 02387804 | 11/2002 |
| WO | 2006037492 A | 4/2006 |
| WO | 2009018489 A | 2/2009 |
| WO | 2009124223 A | 10/2009 |
| WO | 2010037064 A | 4/2010 |
| WO | 2010040010 A | 4/2010 |
| WO | 2010101935 A | 9/2010 |
| WO | 2011091085 A | 7/2011 |

OTHER PUBLICATIONS

RFC 3986: Uniform Resource Identifier (URI): Generic Syntax; T. Berners-Lee, R. Fielding, L. Masinter; Jan. 2005; The Internet Society.

Kim et al. "In-service Feedback QoE Framework" 2010 Third International Conference on Communication Theory. Reliability and Quality of Service. pp. 135-138. 2010.

Matos et al. "Quality of Experience-based Routing in Multi-Service Wireless Mesh Networks" Realizing Advanced Video Optimized Wireless Networks. IEEE. pp. 7060-7065. 2012.

Tran et al. "User to User adaptive routing based on QoE" ICNS 2011: The Seventh International Conference on Networking and Services. pp. 170-177. 2011.

Wu et al. "Quality Evaluation in Peer-to-Peer IPTV Services" Data Traffic and Monitoring Analysis, LNCS 7754. pp. 302-319. 2013.

* cited by examiner

SYSTEM AND METHOD FOR AUTHORIZING AND CONNECTING APPLICATION DEVELOPERS AND USERS

CROSS-REFERENCE TO RELATED APPLICATIONS

This application claims the benefit of U.S. Provisional Application No. 61/537,207, titled "SYSTEM AND METHOD OF AUTHORIZATION AND CONNECTION BETWEEN APPLICATION DEVELOPERS AND USERS", filed 21 Sep. 2011, and U.S. Provisional Application No. 61/621,867, titled "SYSTEM AND METHOD OF AUTHORIZATION AND CONNECTION BETWEEN APPLICATION DEVELOPERS AND USERS", filed 9 Apr. 2012, which are incorporated in their entirety by this reference.

TECHNICAL FIELD

This invention relates generally to the telephony field, and more specifically to a new and useful system and method for authorizing and connecting application developers and users in the telephony field.

BACKGROUND

In recent years, there has been an explosion of interest in customized application software executable on one or more types of devices, including personal computers and mobile devices. In the telephony market, however, the development of an application ecosystem has been stunted in part by the lack of an efficient system and/or method for managing relationships between the software developers and the application users. In particular, given that many telephony services are priced at variable rates, many talented software developers are trying their hand creating easier-to-manage flat-fee applications for sale. In effect, the complexities of telephonic billing act as an artificial barrier to entry against application developers, who lack the resources and desire to compete with established telecommunications players in the commercial domain of the latter. Given the importance of communications, however, there is a great need for attracting more developers and applications into the telephony marketplace. Thus, there is a need in the telephony field to create a new and useful system and method for authorizing and connecting application developers and users. This invention provides such a new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. System for Authorizing and Connecting Application Developers and Users

Figure 1:
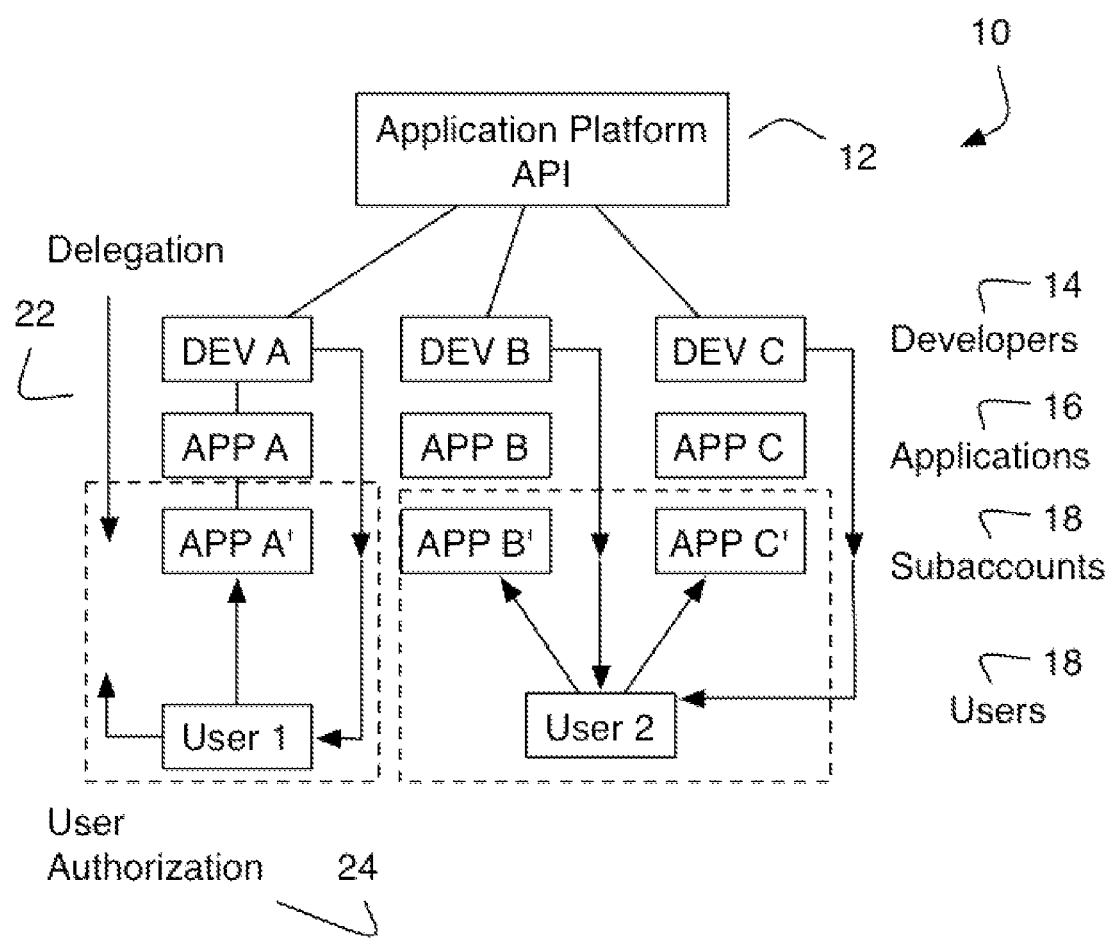
FIG. 1 is a schematic block diagram of a system according to a preferred embodiment of the present invention.

FIG. 1 is a schematic block diagram of a system 10 for authorizing and connecting application developers and users in accordance with one or more preferred embodiments described below. FIG. 1 also illustrates an operating environment of the system 10 of the preferred embodiment, which can include for example an Application Programming Interface (API) of the type generally available from the assignee of the present application. As used herein, the term API should be understood to mean any combination of software, firmware, and/or hardware that allows two or more software applications (i.e., machine-readable instructions) to communicate with one another. The system is preferably used in combination with an application platform with an API. The application platform preferably enables developer creation of applications utilizing at least some features of the platform. In one variation the application platform is a communication platform used for voice, video, or messaging. An example API can be configured as a telephony platform such as one substantially similar to the one described in published U.S. Patent Application No. 2009/0252159, titled "SYSTEM AND METHOD FOR PROCESSING TELEPHONY SESSIONS", assigned to the assignee of the present application, and hereby incorporated in its entirety by this reference.

As shown in FIG. 1, the API 12 of the preferred embodiment functions to permit one or more developers 14 (DEV A, DEV B, DEV C) to independently and efficiently create software programs for telephonic applications 16, including, but not limited to telephony-based voice calls, internet based voice calls, video calls, video streams, video sessions, screen sharing, screen sharing streams, screen sharing sessions, SMS messaging, MMS messaging, IP-based messaging, proprietary messaging, alternative messaging, or any suitable form of communication. The applications 16 can be stored and retrievable in a database or databases (not shown) and made accessible to one or more users or purchasers. Applications may be stored in the database as a Uniform Resource Identifier (URI) reference to an application hosted by the developer or alternative. The URI will preferably reference the application located on a server maintained by the developer. Preferably, the applications 16 (APP A, APP B, APP C) created by the developers 14 can be associated with a user account of each respective developer. In one variation of the system 10 of the preferred embodiment, each application 16 can be uniquely identified according to its own user account. Alternatively, each application can be uniquely identifiable, but remain associated with one or more user accounts of the respective developer.

The system 10 of the preferred embodiment can further accommodate one or more users 20 (USER 1, USER 2), who can be independent third parties including individuals or businesses that desire to use a selected application for a particular purpose. A user preferably has an account. As shown in FIG. 1, the users 20 of the system 10 of the preferred embodiment can be associated with the applications 16 through one or more subaccounts 18 (APP A', APP B', APP C'). A user may additionally be associated with a plurality of subaccounts for various applications as shown for USER 2. Thus a single user can use a single user account to use multiple applications developed by different developers. Subaccounts 18 are preferably child accounts linked to a main account of the user 20. The subaccounts may alternatively be defined within parameters of the user account. Subaccounts are preferably associated with an application 16 provided by a developer account. Alternatively, the subaccounts 18 can be uniquely associated with each application 16, or each developer 14, or any suitable combination thereof. In another alternative, the subaccounts 18 can be configured as partitions or uniquely identifiable portions of the parent account application 16. In one variation of the system 10 of the preferred embodiment, each application 16 can be associated with a unique developer account on the one hand and one or more unique user subaccounts on the other hand, such that each developer can create an application/account associated with multiple users/subaccounts.

As shown in FIG. 1, the system 10 of the preferred embodiment can facilitate management and interaction between the developers 14 and the users 20 through the creation of the subaccounts 18 and through a delegation process 22 and a user authorization process 24 described in more detail below. Permissions are preferably granted for an application or developer account to operate on a user account. These permissions are preferably defined with respect to the subaccount of the user associated with the particular application. Preferably, the developer 14 can create a list of delegable items or permissions, such as for example read-only access to the API (e.g., log access, event or message access), full access to the API (e.g., making calls, sending SMS messages, purchasing or modifying phone numbers) and access to all caller ids. In other words, permissions preferably can define how an application may access data or act on behalf of a subaccount of a user. The subaccounts may additionally be configured for customized use of an application. In one variation the system and method of a preferred embodiment may be integrated with a system or method substantially similar to the one described in published U.S. Patent Application No. 2011/0283259, titled "METHOD AND SYSTEM FOR CREATING A PLATFORM APPLICATION WITH MULTIPLE APPLETS", filed 14 Jun. 2011, assigned to the assignee of the present application, and hereby incorporated in its entirety by this reference.

As used herein, API configuration/s are preferably RESTful in nature, and the applications 16 also preferably observe the principles of a RESTful design. RESTful is understood in this document to describe a Representational State Transfer architecture as is known in the art. The RESTful HTTP requests are preferably stateless, thus each message communicated from the call router to the application server preferably contains all necessary information for operation of the application server and response generation of the application server. Hardware communications elements such as routers and servers preferably do not need to remember or store previous communications to be aware of the state. Documents, media, and application state are preferably viewed as addressable resources, combined with data provide to the resource via request parameter, such as HTTP GET or HTTP POST parameters, or request body contents. Such request data may include an updated representation of the call resource, or other call state data generated as a result of call router operation, such as digits pressed on the keypad or audio recordings generated.

State information included with each request can include a unique call identifier, call status data such as whether the call is in-progress or completed, the caller ID of the caller, the phone number called, geographic data about the callers, and/or any suitable data. Alternatively, a varying level of a RESTful communication (statelessness) can be used, such as by using cookies, session tracking, or any suitable devices to simulate a normal website visitor model. Preferably, data sent with each request can fully enable the application server to determine the next state of the call to execute. RESTfulness preferably does not preclude using external datasource, such as a database, to lookup additional data to log call meta data, or determine application logic.

Figure 2:
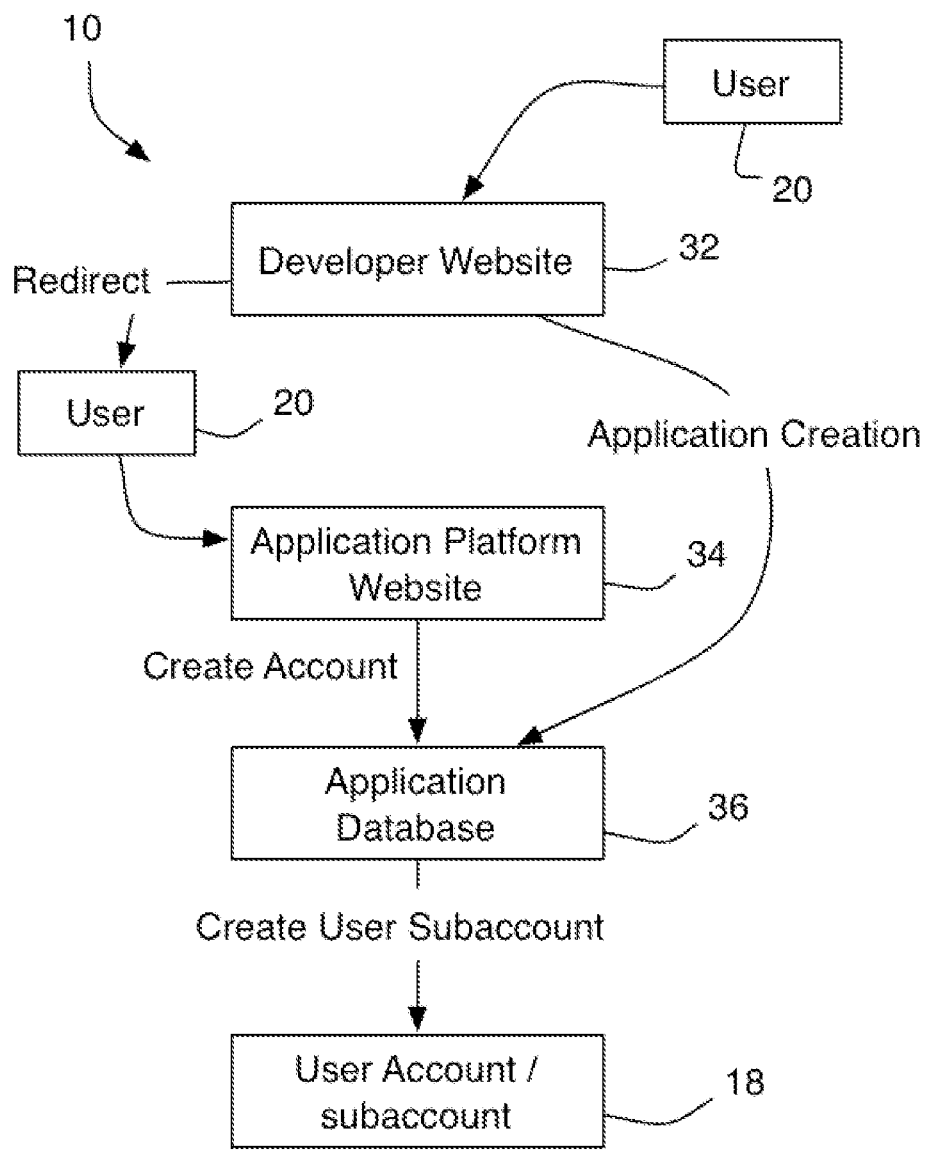
FIG. 2 is a schematic block diagram of another aspect of the system of the preferred embodiment of the present invention.

FIG. 2 is another schematic block diagram illustrating additional aspects of the system 10 of the preferred embodiment. As shown, a user 20 can interface with a developer website 32 in order to discover and/or acquire an application 16 of the type described above. In one variation of the system 10 of the preferred embodiment, the developer website 32 can be configured to redirect the user 20 to a separate website 34, such as that of the assignee of the present application. At the separate website 34, the user can authenticate and/or create a user account to delegate API access or other permissions for a subaccount associated with an application. Alternatively, the developer website 32 may utilize an API to cooperatively communicate with an application platform to authenticate and/or create a user account. As shown in FIG. 2, the developer 14 can create and/or store his or her application 16 in an application database 36 affiliated or associated with the website 34, such that when as user 20 requests access to an application 16 he or she is redirected to a centralized or quasi-centralized repository of applications 16 configured for interfacing with the API 12. As described above, the application database 36 may be a URI reference to an application or application assets hosted on an outside server or device.

Figure 3A:
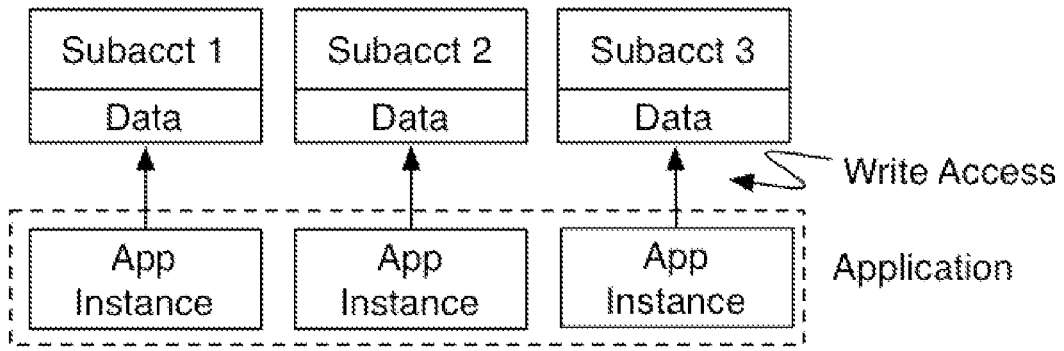
FIGS. 3A, 3B, 3C, and 4 are schematic block diagrams of another aspect of the system 10 of the preferred embodiment of the present invention.
Figure 3B:
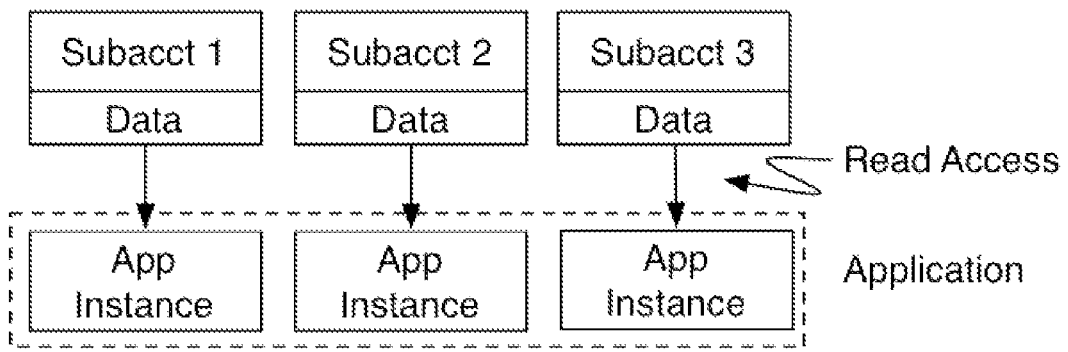
Figure 3C:
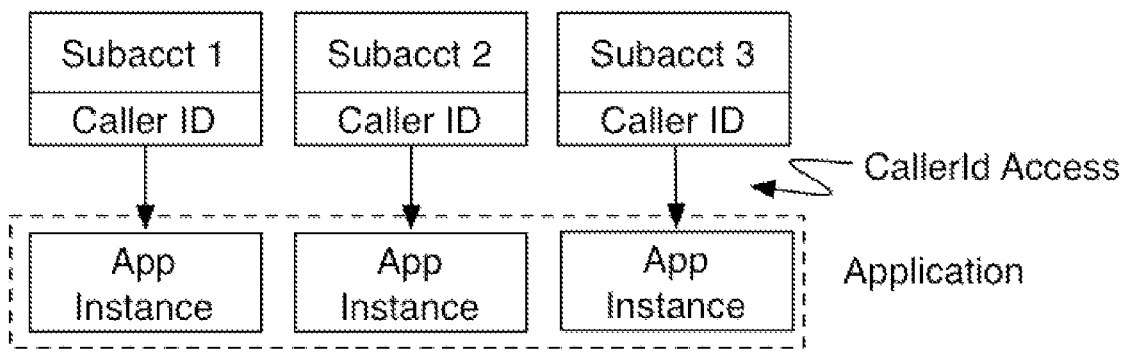

In other variations of the system 10 of the preferred embodiment, the website 34 can request or require of the user 20 the creation of a separate user account 18, which can be configured as a subaccount 18 associated with the developer's account/application 16 as described above. The subaccount 18 of the preferred embodiment can be configured with one or more permissions, restrictions, delegations and the like for establishing the boundaries of the application's permitted usage of the subaccount 18. The permitted usage preferably specifies the ways in which the application associated with the subaccount can interact with or on behalf of the user account. Alternatively or additionally, the permitted usage may determine what actions or features of the application a subaccount may use. FIGS. 3A, 3B and 3C schematically represent variations of the system 10 of the preferred embodiment. As shown in FIGS. 3A, 3B, and 3C, multiple independent applications can be simultaneously authorized, and the use of subaccounts prevents data sharing between the applications. As an example, the respective applications will not have access to call records, SMS records, or phone numbers of other developer-authorized applications.

In one variation of the system 10 of the preferred embodiment, data flow (call records, SMS records, phone records) between an account 16 and a subaccount 18 can be asymmetrical and/or restricted in that data relating to the subaccount 18 can be accessed by the account 16. Alternatively, certain permissions can allow for the flow of data (in whole or in part) from the account 16 to one or more subaccounts 18, or between sibling subaccounts 18. In another alternative, access to all caller ids as shown in FIG. 3C lets an application use a phone number of a parent account or sibling subaccount as the caller ID for a phone call or message placed by the subaccount affiliated with the application. In another alternative, the owner of the account 16 can reconfigure or redefine the permission profile of the subaccount 18, including expanding or limiting the permissions and authorizations of the subaccount 18 as well as complete revocation or termination of the subaccount 18.

Figure 4:
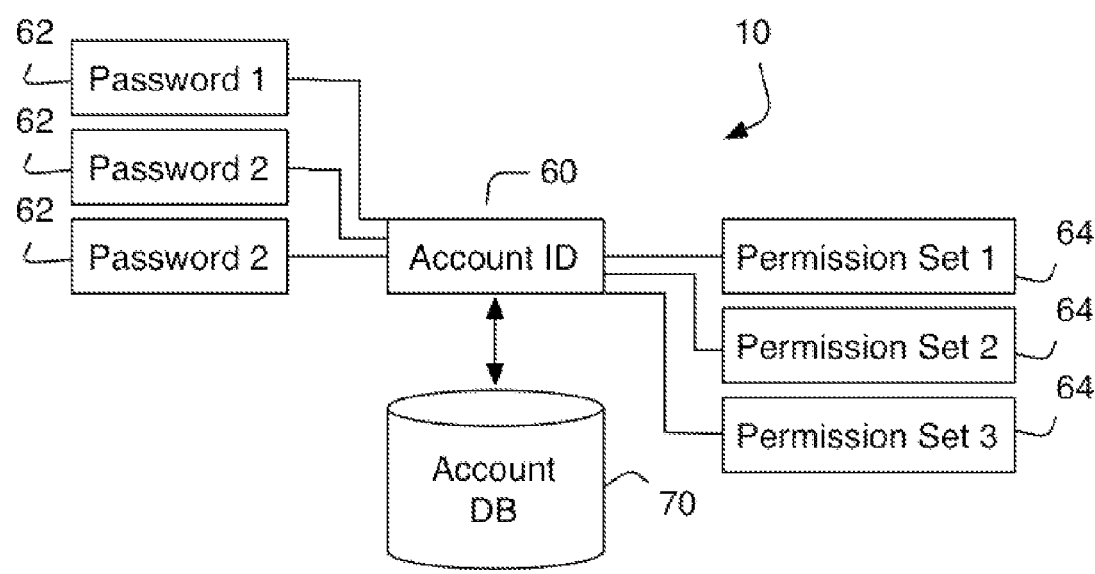

As shown in FIG. 4, another variation of the system 10 of the preferred embodiment can include an account ID module 60 that functions to receive one or more passwords (or secure IDs) 62 and correlate the received passwords 62 to one or more permission sets 64. Preferably, the account ID module 60 can be disposed at or in communication with the API 12 and/or an account database 70. Preferably, the account ID module 60 can be stateless and receive the passwords 62, pass the passwords to the account database 70, and receive any associated permissions 64 in response thereto. The receipt and transmission of the passwords 62 and the associated permissions 64 can be accomplished through HTTP, HTTPS, or any other suitable transport layer protocol/s. Preferably, all account data is maintained in a secured and/or encrypted format, and the account ID module 60 does not have to encrypt/decrypt any transmitted data. For example, the passwords 62 can include one or more tokens containing unique or quasi-unique identifying information that can be passed through the preferred system 10 with little risk of compromising the information contained therein. Similarly, the permissions 64 associated with the passwords 62 can include a second token or a hash of the password token and the permission set data, which can also be passed through the preferred system 10 in the same manner. As shown in FIG. 4, there is preferably a one-to-one correlation between the password 62 and its associated permissions 64. Moreover, there is not necessarily the same correlation between a user account 18 and the permissions 64, as the user account 18 can include a single user ID having multiple passwords 62, each of which is associated with a set of permissions 64. As an example, each of the subaccount users shown in FIGS. 3A, 3B, and 3C can be associated with a different password for the user account 18. Accordingly, upon entry of each password 62, the users are associated with one or more features or aspects of the subaccounts through the corresponding set of permissions 64.

Figure 5:
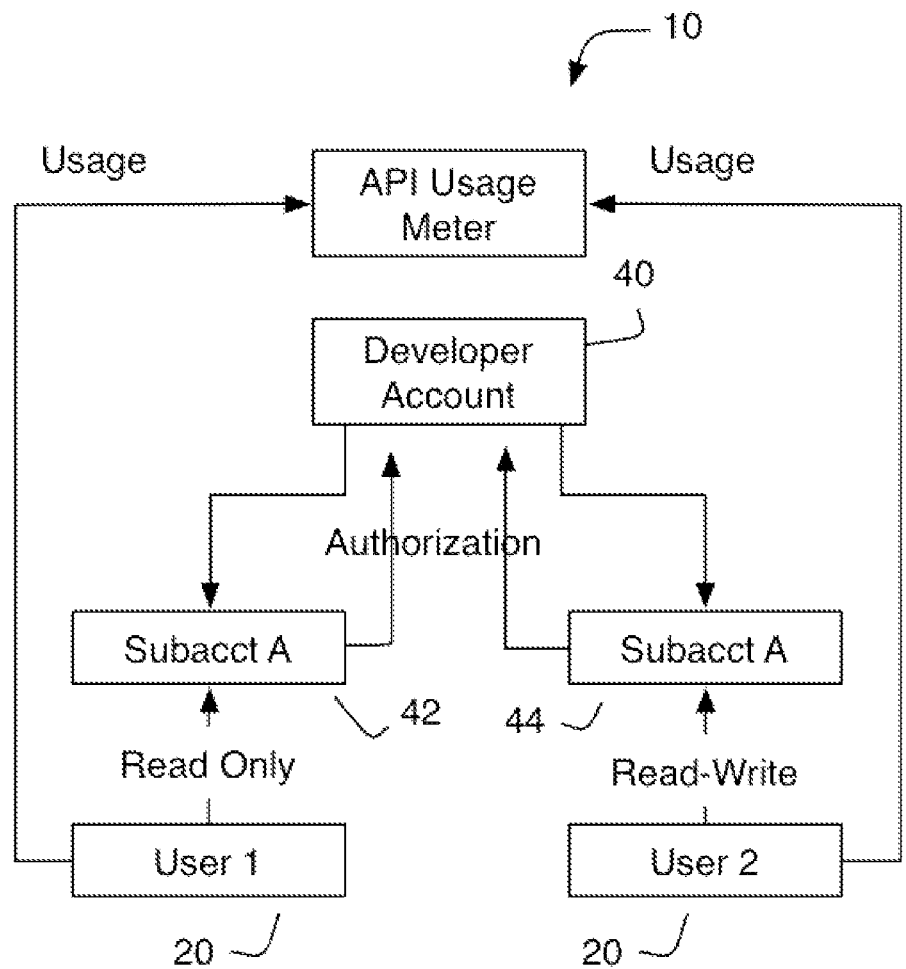
FIG. 5 is a schematic block diagram of another aspect of the system of the preferred embodiment of the present invention.

FIG. 5 is a schematic block diagram depicting additional aspects of the system 10 of the preferred embodiment. As shown, a developer account 40 or parent account can be associated with two or more authorized subaccounts, such as SUBACCT A 42 and SUBACCT B 44 with distinct permissions (read-only, read-write, callerid, and the like.) Each of the subaccounts preferably has their usage individually metered. This usage preferably does not count against the developer account of the other subaccount. This usage is preferably stored and can be used in determining compensation required from a user account. Similarly, limits on the amount of usage for a subaccount may be set. As an example, metering and/or compensation for the subaccount access or usage can be based on minutes, data consumption, SMS message allotment, permissions, restrictions, authorizations or any suitable combination thereof. Accordingly, if the application 16 in question is a voice communication application, then the user 20 can create a subaccount 18 containing a certain number of minutes/megabytes of usage on that particular account. Similarly, in an enterprise context, more than one subaccount 18 can have callerid-type access to a group of potential phone numbers associated with the primary account and/or the several other subaccounts 18.

Figure 6:
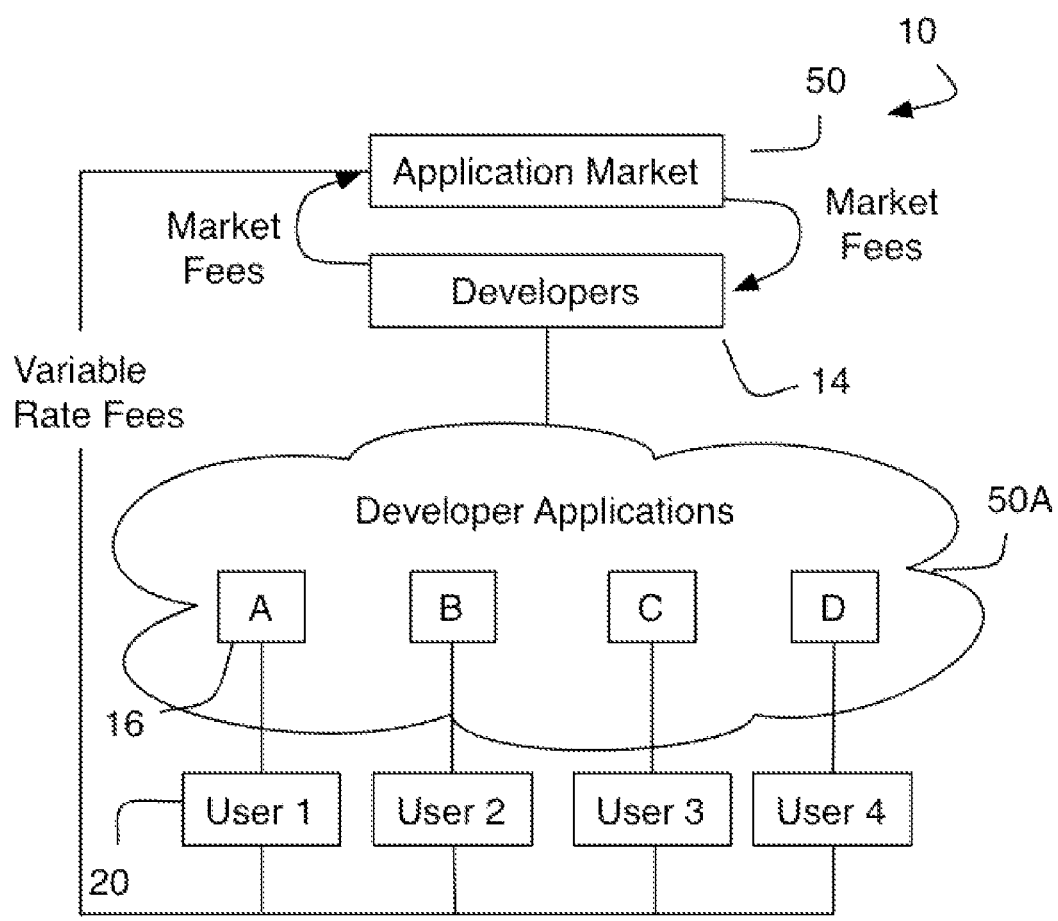
FIG. 6 is a schematic block diagram of another aspect of the system of the preferred embodiment of the present invention.

Additional aspects of the system 10 of the preferred embodiment are shown in FIG. 6, which is a schematic block diagram illustrating one example environment in which users, developers and API providers can create, sell, and use applications of the type described above. As shown, a control module 50 or market can interface with one or more developers 14 attempting to create and/or distribute their application content. Preferably, the control module 50 functions to distribute and account for one or more applications 16 created by the developers 14. The control module 50 of the preferred embodiment can include one or more computers, servers, or a distributed network of computers and servers accessible by one or more users. Alternatively, the control module 50 can reside entirely in a cloud system. The control module 50 of the preferred embodiment can also include software development assistance. As an example, the control module 50 can include for example Twilio brand customized software solutions configured to assist developers 14 in the creation of applications suited for use with one or more Twilio brand APIs.

The system 10 of the preferred embodiment can also include a server 50A or storage system (such as a cloud-based storage system) for one or more applications 16 (shown A-D) created by the developers 14 and hosted by the control module 50. The server 50A of the system 10 of the preferred embodiment functions to host and/or electronically distribute the applications 16 to users 20. In one variation of the system 10 of the preferred embodiment, the control module 50 can be integrated with the server 50A. Alternatively, the control module 50 can include a front-end developer interface and backend accounting and system management module/s separate and distinct from the server 50A.

In the system 10 of the preferred embodiment shown in FIG. 6, users A through D 20 can be individual and/or corporate consumers of telephony applications of the type described above. For example, the users 20 might have interests in applications 16 relating to voice or SMS communications, customer relations management, enterprise communications, or any other suitable application for which the API 12 is suited. While the developers 14 associated with the applications 16 might have a strong affinity for software development, the commercial management and widespread distribution of an application might not interest all developers 14. As such, the system 10 of the preferred embodiment shown in FIG. 6 permits the users 20 to pay one or more variable rate type fees (i.e., fees based on allocated minutes, data, permissions, restrictions, and the like) to the control module 50, which is more readily adapted for management of such a complex commercial environment. The fees may be collected for usage of a specific subaccount of an application or more preferably for the consolidated usage of all subaccounts and the user account. For example a user account may use two different applications (i.e., has two subaccounts) and may additionally have its own application using the platform, and the user account can pay a single fee. The control module 50 can then compensate the developers 14 in response to the variable rate fees received from the users 20 for the usage of the various applications 16. The compensation may be in credit or as a monetary transaction). In one alternative, the control module 50 can compensate the developers 14 in proportion to the number of applications 16 hosted on the server 50A. Alternatively, the control module 50 can compensate the developers 14 in proportion to the amount of variable rate fees consumed by the users 20 of the respective applications 16. As an example, if user A pays $20.00 per month to the control module 50 for data consumption related to application A, then the control module 50 can compensate the developer of application A in some proportional amount, i.e., a fixed or variable percentage of the fees received per application.

Aspects of the system 10 of the preferred embodiment can be configured in a computer-readable medium storing computer-readable instructions. The instructions are preferably executed by computer-executable components that are preferably integrated with the API 12, the application/s 16, the subaccount/s 18, the control module 50 and/or server 50A. The computer-readable medium can be stored on any suitable computer readable media such as RAMs, ROMs, flash memory, EEPROMs, optical devices (CD or DVD), hard drives, floppy drives, or any suitable device. The computer-executable component is preferably a processor but the instructions can alternatively or additionally be executed by any suitable dedicated hardware device.

2. Methods for Authorizing and Connecting Application Developers and Users

Figure 7:
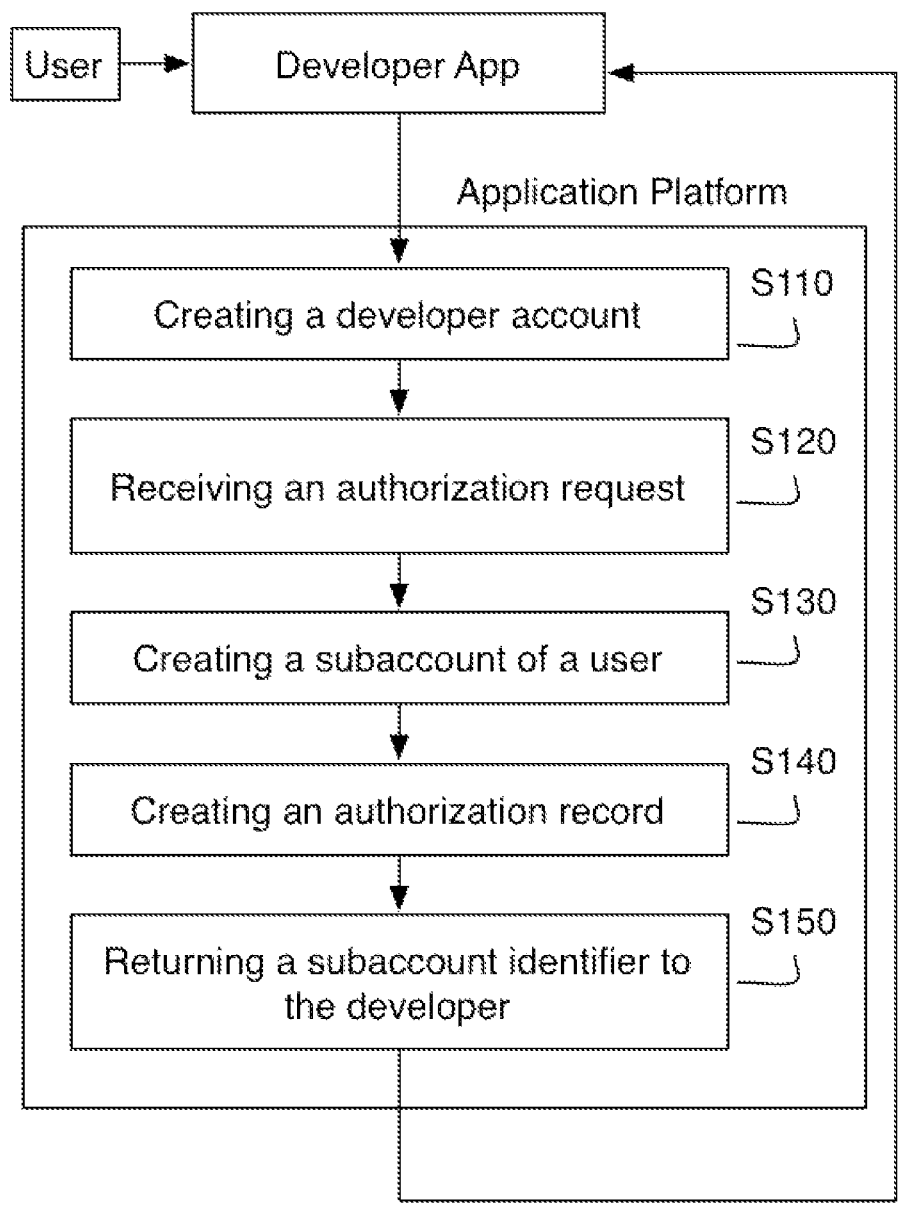
FIG. 7 is a schematic block diagram of a method according to a preferred embodiment of the invention.

The system 10 of the preferred embodiment, in its various aspects and variations, can be configured to perform one or more methods of the preferred embodiment. As shown in FIG. 7, a method for authorizing and connecting application developers and users of a preferred embodiment can include creating a developer account associated with an application S110, receiving an authorization request to authorize the application to act on a user account S120, creating a subaccount for a user, wherein the subaccount is associated with the developer account S130, creating an authorization record associated with a subaccount S140, and returning a subaccount identifier S150. The method functions to enable app developers on an application platform to allow users with their own account to use an instance of the developer's application. The use of subaccounts has many benefits such as segregating user data, enabling varying levels of functionality according to a permission profile, easier fee management, and other benefits. One benefit of the system and methods of the preferred embodiments is conferred by the use of subaccounts, which permits a user to distribute his or her authorizations and/or application to a number of developers while protecting against the inadvertent sharing of application-related information. If a developer authorizes multiple independent applications, the user of sub-accounts prevents data such as call records, SMS records, and phone numbers that are used by one application from being seen or modified by another application. The method is preferably performed by a system as described above at an application platform, and the application platform is preferably a telephony application platform such as the one provided by the assignee of the present application.

Step S110, which includes creating a developer account associated with an application, functions to assist in hosting, distributing, and accounting for any application/s created by a developer. The developer account is preferably the account mechanism within an application platform from which a developer may manage account settings and application settings. A developer account may be substantially similar to a user account, but a developer account is distinguished by including an application that may include subaccounts. In one variation of the method of the preferred embodiment, the developer account can itself be a subaccount of a second developer account (i.e., the developer account is a user subaccount of the second developer account). Thus a developer can nest different applications/subaccounts within a larger account framework. Creating a developer account can additionally include setting subaccount settings for a developer account. The subaccount settings may determine permission profiles, resources to support subaccount creation process, and any suitable parameter of an application. The resources to support subaccount creation process preferably include URIs for the application, authorization callbacks, deauthorize callbacks, and/or any suitable URIs of the application. As described later, the application platform preferably returns the authorization record to the authorization callback URI of the developer. As noted above, suitable applications can include for example software or other machine-executable instructions that use an API 12 of the type described above. Example applications can include, but are not limited to telephony-based voice calls, internet based voice calls, video calls, video streams, video sessions, screen sharing, screen sharing streams, screen sharing sessions, SMS messaging, MMS messaging, alternative messaging, or any suitable form of communication. Applications of the method of the preferred embodiment can include targeted and/or selected access to a REST API of the type described herein; and the applications preferably obey the principles of RESTful design described in detail above.

Step S120, which includes receiving an authorization request to authorize the application to act on a user account, functions to initialize the subaccount creation process. The authorization request may be formed as a request to create a subaccount of an application. The authorization request is preferably initialized by receiving an HTTP request at the application platform. The authorization request preferably includes an application or developer identifier, and may additionally include user account information. The developer account or application to associate with the received subaccount creation request may alternatively be determined in any suitable manner. A user action preferably initiates the sending of the subaccount creation request. In one variation of the method of the preferred embodiment, the user can locate an application on a website or other service provided by the application developer. Alternatively, the user can access the developer application on a centralized server, market, or control module associated with the API of the type described above.

The interface presented to the user during the authorization/subaccount creation process can be through an interface provided by the application platform or alternatively through a third party site or application. In one variation, a user will click on or activate a link from a developer website which will open or redirect the user to a page of the application platform. In this variation, the application platform will be visible to the user. In another variation, a user will interact with an application or site of the developer, and the developer site will use an API to programmatically communicate with the application platform and to begin the authorization process. In this variation, the application platform and the authorization process can be transparent to the user.

Step S130, which includes creating a subaccount for a user, wherein the subaccount is associated with the developer account, functions to create a subaccount of the user account and associate the user and the subaccount with an application. Creating a subaccount further functions to separate the functional authorizations of the user from those of the main account (developer account or application) thereby permitting a developer to partition and commercialize his or her application using the API. In a variation of associating the subaccount with the developer account, the subaccount may be associated with an application of the developer account.

Figure 8:
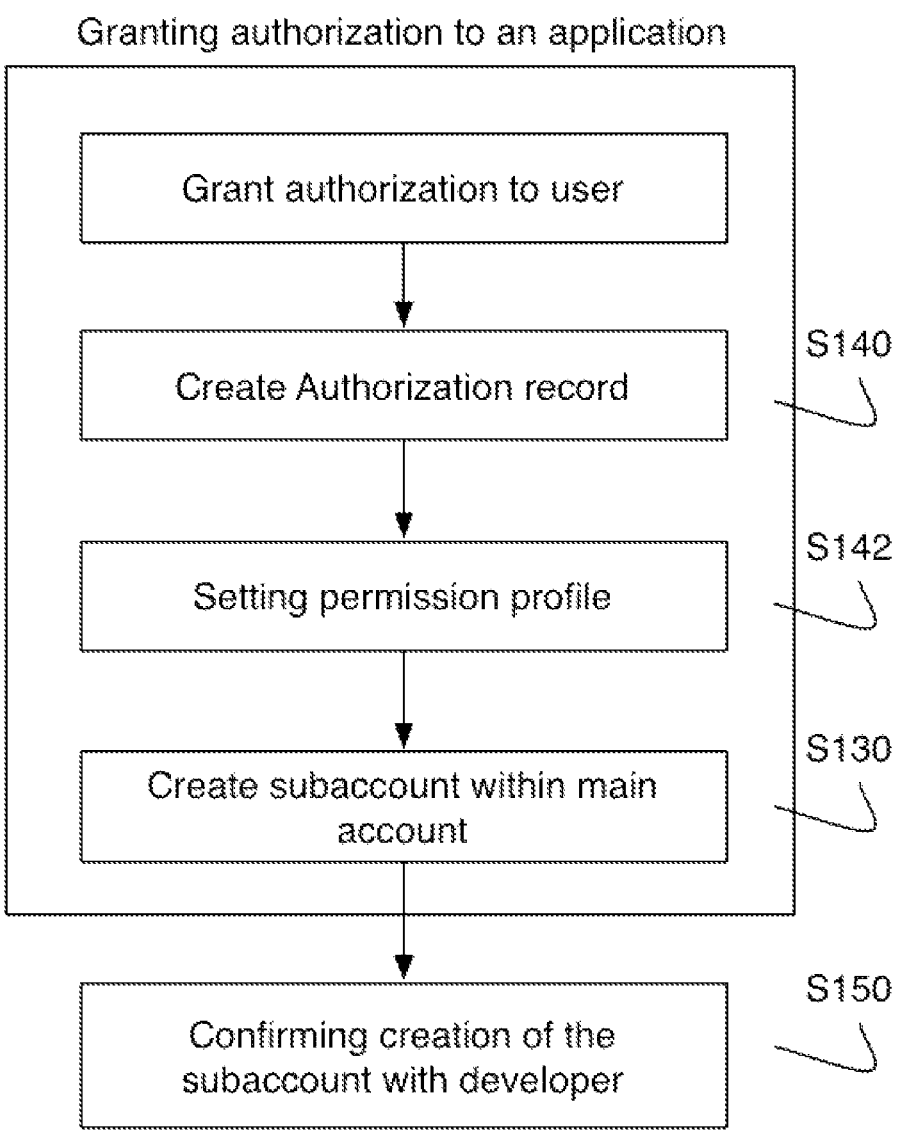
FIG. 8 is a detailed flowchart a subaccount creation process of a method according to a preferred embodiment of the invention.

The subaccount can be uniquely associated with a user account. As used herein, the term user can include any individual, corporation or artificial entity, acting either individually or collectively that is interested in the operation and/or consumption of one or more applications. In the application platform, a user preferably has a user account or will have a user account created on behalf of the user. Alternatively, the subaccount may be the only account record in the application platform for a particular user. Preferably, the user expresses an interest in acquiring access to an application. The user, the application, developer account or any suitable entity will initiate a the authorization process by submitting an authorization request in Step S120. As a result a subaccount can be created. The application platform or developer site may perform any suitable form of user authentication/authorization. In the case where the application platform has usage fees, payment information may be collected from the user. As shown in FIG. 8, the subaccount creation process can include authorizing, creating a user account, creating an authorization record, creating a subaccount, and/or any suitable subaccount step. The steps of creating a subaccount can be performed in any suitable order with using any suitable step to gate proceeding to the next step. Similarly, the steps may alternatively be performed substantially simultaneously.

Step S140, which includes creating an authorization record associated with the subaccount, functions to create a mechanism that a developer can use to act on behalf of a subaccount or enable a subaccount application. Preferably, a user or client on behalf of a user (e.g., developer site) completes the steps necessary for the application platform to authorize the user to the application and/or developer. The authorization record can include a user identification, an application identification, and a permission profile including any one or more permissions granted to the user for the identified application. The authorization record can additionally include the password or secure ID (SID) that acts as a token to later authorize subaccount actions. Preferably, the authorization record can be stored on the application server in a separate database. Alternatively, the authorization record can be stored in any suitable location, including in a server or market type environment of the type described above.

Additionally, Step S140 preferably includes setting a permission profile associated with the subaccount, which functions to establish the boundaries of the application's permitted usage of the user's subaccount. A permission profile of a subaccount or listing of requested and/or potential permissions can be directly associated with the application. Suitable and/or possible permissions can include for example read-only access, full read/write access (making calls, sending SMS messages, purchasing or modifying phone numbers) and/or access to all caller ids. Read-write access in some variations may allow an application to perform metered API calls on behalf of a user account. For example, in a telephony platform, an application may make phone calls that will count against the usage of the user account and not the developer account. In one variation of the method of the preferred embodiment, data flow (call records, SMS records, phone records) between a developer account and a subaccount can be asymmetrical and/or restricted in that data relating to the subaccount can be accessed by the account. Alternatively, certain permissions can allow for the flow of data (in whole or in part) from the account to one or more subaccounts, or between sibling subaccounts. In another alternative, access to all caller ids lets an application use a phone number of a parent account or sibling subaccount as the caller ID for a phone call or message placed by the subaccount affiliated with the application. In another alternative, permissions may set usage limits or set parameters that determine characteristics of how permissions are interpreted when being enforced. For example, a number for how many usage based API calls can be made by an application may be set. As a result the application can preferably make no more than that number of API calls on behalf of the subaccount. The permission profile may be specified in the subaccount creation request, default to a particular setting, require user input in an interface, use permission profile specified for the application/developer account, and/or be determined in any suitable manner. Permissions may be set as a group either allowing all requested permissions for an application or denying all permissions. Alternatively, permissions may be set individually allowing a user to set permissions in a piecemeal fashion.

In one alternative variation, a permission profile for the application or a developer account can be used in setting a permission profile of a subaccount. A developer permission profile is preferably created when creating or editing the settings of an application of a developer account. A developer permission profile may be used in combination with a subaccount permission profile. In one variation, the permission profile created for an application may be the permission profile used for all subaccounts associated with the application. In another variation, the intersection of permission profiles for an application and a subaccount may be the permissions used for a subaccount. For example, an application may allow API calls of the type A, B and C, and a user may set a subaccount to allow API calls of type A, B and D. As a result the subaccount will be allowed to use API calls of type A and B. The permission profile can function to determine the scope and boundaries of an application's access to a user's account and thus define the functional and commercial relationship between the developer/application and the user. Other permission limits may additionally be included in the permission profile such as usage limits (e.g., number of phone calls) or whitelisted or blacklisted actions for a subaccount.

Step S150, which includes returning a subaccount identifier, functions to verify and confirm to the developer that the user has been granted access and/or asserted permissions relating to the developer account. The subaccount identifier is preferably transmitted electronically to the developer as confirmation of the user authorization/permission access. The subaccount identification can be transmitted to a developer website through an authorization callback URI. Preferably, the authorization record or at least a portion of the authorization record, the SID, acts as the subaccount identifier. The SID is preferably returned as a parameter transmitted to the authorization callback URI. A developer will preferably retrieve the authorization record or SID and store that for application use. The subaccount identifier may alternatively be stored for access by the developer account or communicated for use by the developer in any suitable manner. The subaccount identifier can preferably be used by the developer to enable the subaccount to use their application with the privileges and permissions established for the subaccount.

Figure 9:
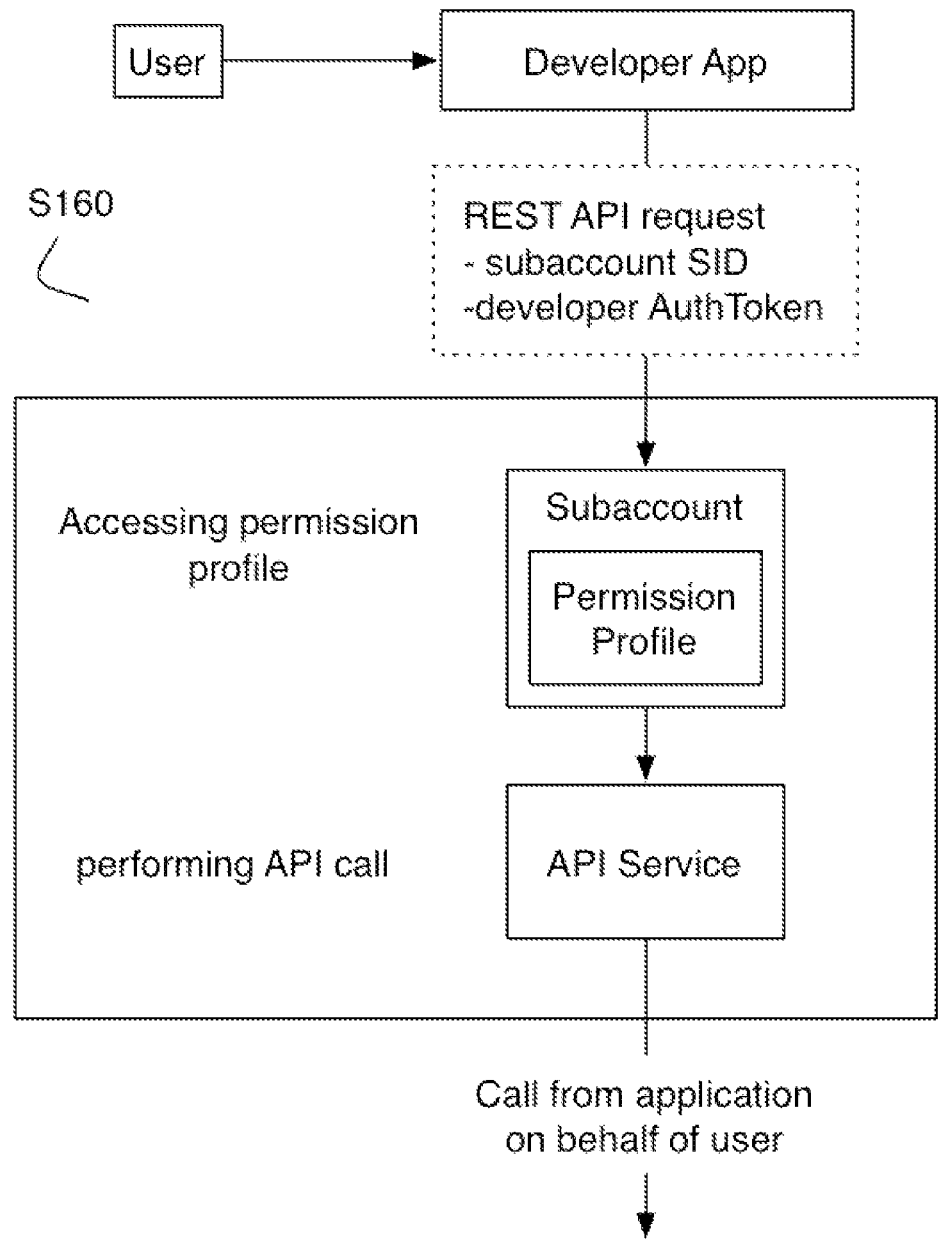
FIG. 9 is a detailed schematic block diagram of allowing subaccount usage of an application a method according to a preferred embodiment of the invention.

As shown in FIG. 9, a method of a preferred embodiment may additionally include allowing subaccount usage by an application in accordance with the authorization record S160. Use of the subaccount resources by an application is preferably limited by the permission profile for the subaccount, the application, and/or the user account. Use of the application preferably includes receiving an API request made on behalf of a subaccount associated with an application. The subaccount identifier and more preferably the SID is used in combination with an application or developer account password or authentication token to permit the subaccount to utilize the designated REST API resources associated with the permissions and application. As shown in FIG. 4, a SID in combination with an authentication token can be used to determine the permissions for that request. A server of the application platform preferably verifies that the given application has been granted authorization to the resource or permission to perform an action. For example, an analytics application may make REST API GET requests for a call list, specifying account auth token and the SID of the subaccount of interest. If the permission profile of the subaccount allows access to the call list of the user account, then the analytics application receives the call list resources. As another example, a telephony application may make REST API requests to send a SMS message on behalf of a user specifying account auth token and the SID of the subaccount of interest. If the permission profile of the subaccount allows write/write access to send an SMS message on behalf of the user account, then the telephony platform will send the message.

A method of a preferred embodiment may additionally include facilitating a marketplace control as shown in FIG. 6, which functions to manage the marketplace operational tasks that can be associated with subaccount usage. Facilitating marketplace control preferably includes retrieving market fees and dispersing fees to a developer account. A control module preferably schedules or carries out fee retrieval routines. Fees may be collected from user accounts and/or developer accounts. According to any compensation arrangements, the control module can transfer fees to the developers. As the subaccounts are separate from the developer account, the usage and metering of the subaccounts preferably occurs independently from the developer account, such that each subaccount may be held accountable for individual use of the application. Moreover, as the subaccounts are owned by the user, the usage and metering of the subaccounts preferably is included in the usage accrued by the user account.

In another variation of the method of the preferred embodiment, the user can revoke and/or modify the permission profile for an application previously authorized, thereby preventing further usage of the REST API resources by the designated application. In another variation of the method of the preferred embodiment, the method can further include verifying at a server, such as the application server, that the permissions were properly granted by the user and properly asserted by the application.

Figure 10:
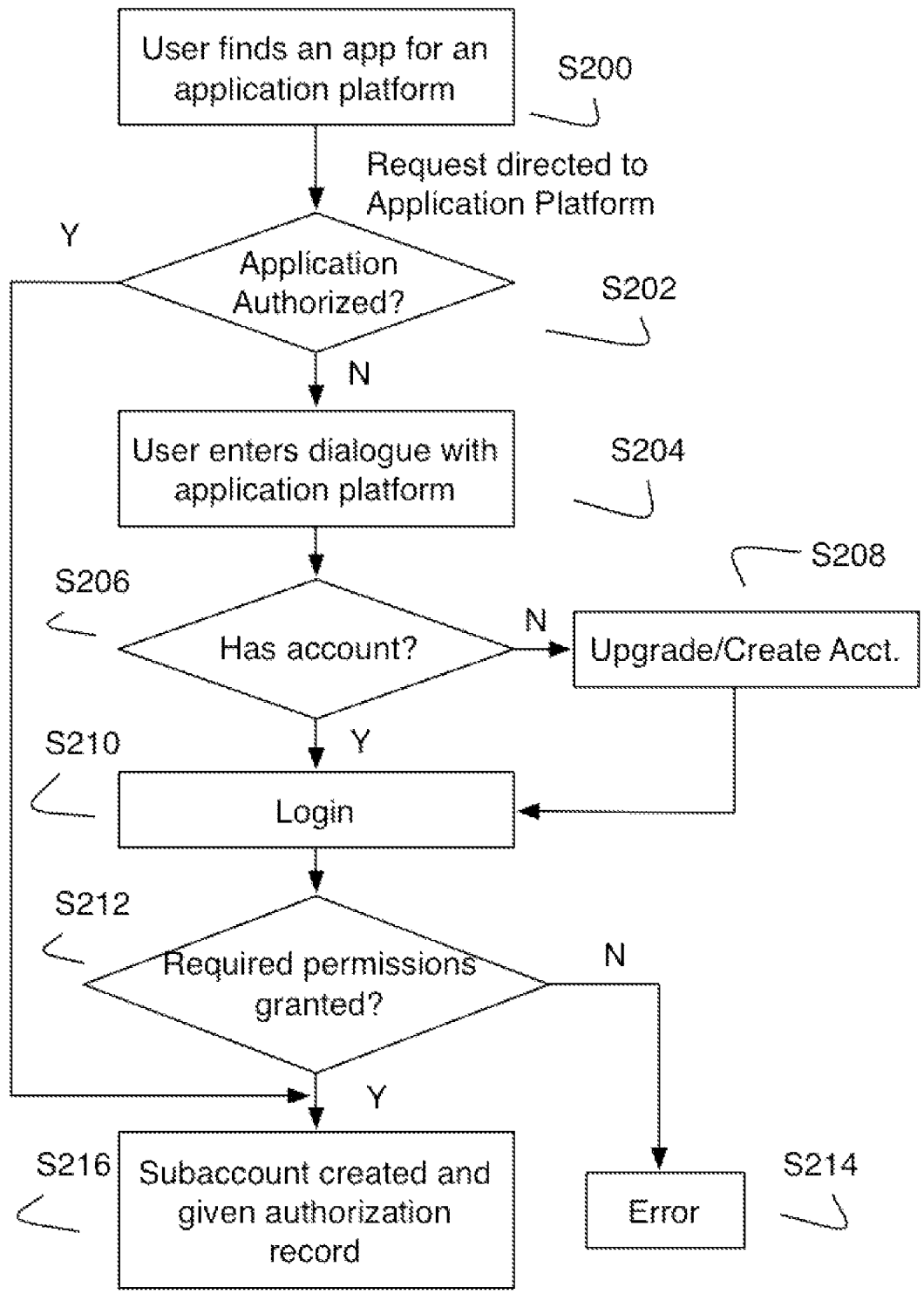
FIG. 10 is a flowchart depicting additional aspects of the method according to the preferred embodiment of the present invention.

FIG. 10 is a flowchart depicting additional aspects of the method of the preferred embodiment as viewed from a potential user. As shown, block S200 recites finding an application of interest by a user. In one variation of the method of the preferred embodiment, the application is of the type described above and created by a developer. As noted above, the developer can assign or define a permission profile to the application. In another variation of the method of the preferred embodiment, the application can be associated with a unique identifier and stored in a database. Alternatively, the application can be designated with a unique or quasi-unique identifier and stored in one or more databases, including a database or marketplace of the type described above.

Decision block S202 of the method of the preferred embodiment queries whether the user has authorized the application to access his or her account. If the response is affirmative, then, as shown in FIG. 10, the method of the preferred embodiment proceeds to block S216 in which the application is assigned a unique identification representing a subaccount of the user account. If the response to decision block S202 is negative, then the method of the preferred embodiment proceeds to block S204, in which the user is engaged to sign up with the API provider. The dialogue between the user and the API provider, which can be the assignee of the present application, can occur through any suitable communication means, including on the API developer website or on a dedicated portion or link from the developer's website. When the dialogue occurs on the developer's website the developer preferably communicates with the API provider site through an API enabling the creation and assignment of subaccounts. As previously noted, the user may come across the application on a third party or developer website, through a developer communication such as an email, or on another commercial store for applications. In such an event, the third party vendor (developer or otherwise) can redirect the user to the website of the API provider for proper authentication and registration of the user.

As shown in FIG. 10, in these variations of the method of the preferred embodiment if the user does not have an existing account (for identification, delegation and authorization purposes), then he or she is asked to create such an account in block S208. Conversely, if the user does have an existing account, then the method of the preferred embodiment invites him or her to login at block S210 thereby accessing his or her identification, delegation and authorization profile. In another variation of the method of the preferred embodiment, a user login can be conditioned upon one or more application conditions, such as for example whether the application requires an incoming phone number for operation. In such a case, the method of the preferred embodiment can require that the user either purchase a phone number for use with the application or select an existing phone number to be associated with the use of the application.

Following a login by the user, block S212 of the method of the preferred embodiment queries whether the requested permissions have been granted to the application by the user, that is, whether the application possesses the proper authorization to access the user account in the manner requested. In another variation of the method of the preferred embodiment, block S212 can additionally include comparing a permission profile established by the developer with a permission profile asserted by the user. As shown in FIG. 10, if the response to the query in block S212 is negative, then the user session is terminated at block S214. Alternatively, the user can be referred to another opportunity to upgrade his or her permission profile to meet those required by the application. For example, if the user has only purchased a read-only permission but the application requires full read-write, then the method of the preferred embodiment can offer the user the opportunity to upgrade his or her account to access the desired application.

An alternative embodiment preferably implements the above methods in a computer-readable medium storing computer-readable instructions. The instructions are preferably executed by computer-executable components preferably integrated with a system of an application platform API provider. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

We claim:

1. A method for authorizing application use for a user comprising: at a communication application platform system:

creating a set of developer accounts in the communication application platform system, wherein each developer account in the set of the developer accounts is associated with at least one application of the communication application platform system, each developer account having account settings for at least one application, account settings for each application including at least a Uniform Resource Identifier (URI) for the application, an authorization callback URI of the application, and a de-authorization URI of the application;

receiving a user-initiated request of a user to create a subaccount of a user account of the user at the application platform system, the user-initiated request authorizing an application of a developer account in the application platform system to act on the subaccount of the user account, the request identifying the application associated with a developer account;

creating the subaccount of the user account and associating the created subaccount with the application identified by the user-initiated request, wherein the subaccount of the user account includes segregated data in the application platform system;

creating an authorization record of the subaccount of the user account that includes an application identification of the application identified by the request, a permission profile for the subaccount of the user account, and a secure identifier (SID) to be used by the application to access a communication application programming interface (API) of the application platform system on behalf of the subaccount; and allowing usage of the application of the developer account by the subaccount of the user account in accordance with the authorization record, wherein allowing usage of the application comprises returning a subaccount identifier of the subaccount of the user account to a system of the developer account via an authorization callback URI of the application that is included in the account settings of the developer account, the subaccount identifier including at least the SID of the authorization record, wherein the communication API is accessible by the application of the developer account and the subaccount of the user account; and wherein the method further comprises individually metering API calls of the communication API made by the application on behalf of the subaccount in accordance with the permission profile, wherein metered API calls include at least one of:
API calls for access of the segregated data of the subaccount; and
API calls for telephony communication by using the communication application platform system.

2. The method of claim 1, wherein creating the developer account and creating the subaccount occurs at the communication application platform system, and the API of the communication application platform system includes a telephony voice application API.

3. The method of claim 1, wherein creating the developer account and creating the subaccount occurs at the communication application platform system, and the API of the communication application platform system includes a telephony messaging API.

4. The method of claim 1, wherein the permission profile determines read-only and read-write API access permissions of the application to operate on the segregated data of the subaccount.

5. The method of claim 1, wherein the metered API calls include making a telephony call and sending a text message.

6. The method of claim 1, wherein the permission profile defines application usage limits by metered API calls.

7. The method of claim 1, wherein the developer account is a subaccount associated with a second developer account.

8. The method of claim 1, further comprising receiving compensation according to the metered communication application platform API calls of the subaccount.

9. The method of claim 1, wherein allowing usage of the application comprises receiving application programming interface (API) requests authenticated by the subaccount; and permitting utilization of API resources as permitted by the permission profile.

10. The method of claim 9, wherein permitting utilization of API resources as permitted by the permissions profile comprises permitting read only access to a first set of API resources and permitting read and write access to a second set of API resources.

11. The method of claim 1, wherein the user account is distinct from the developer account.

12. The method of claim 11, wherein a second subaccount is associated with the user account; wherein the permission profile determines API access permissions wherein the API access permissions define permissions to access data of the second subaccount of the user account.

13. The method of claim 1, wherein the communication application platform API is a telephony communication API.

14. The method of claim 1, wherein authorizing the application of the developer account to act on the subaccount of the user account comprises: authorizing the application to access the API of the application platform on behalf of the subaccount.

15. The method of claim 11, wherein creating a subaccount comprises if the user account with the communication application platform is created, executing a login of the user account; if the user account is not created, creating the user account and executing a login of the user account; and wherein the application is authorized to act on the logged in user account.

16. The method of claim 15, wherein creating the subaccount further includes upgrading the user account if the user account does not satisfy requirements of the application.

17. The method of claim 16, wherein upgrading the user account comprises assigning a telephony endpoint to the user account.

18. The method of claim 15, wherein receiving the user-initiated request occurs at a communication application platform website.

19. The method of claim 15, wherein receiving the user-initiated request occurs through at least one API.

20. The method of claim 11, wherein setting a permission profile includes determining user approval of authorization granted to the developer account; and if user approval is denied, canceling creation of the subaccount and the authorization record.

21. The method of claim 11, further comprising at the communication application platform system, retrieving market fees from the user account and dispersing market fees to the developer account.

* * * * *